(12) United States Patent
Carruba

(10) Patent No.: US 10,359,219 B2
(45) Date of Patent: Jul. 23, 2019

(54) SERVICING DEVICES AND METHODS OF USE THEREOF

(75) Inventor: Vincent Carruba, Baldwin, NY (US)

(73) Assignee: The Armor All/STP Products Company, Danbury, CT (US)

(*) Notice: Subject to any disclaimer, the term of this patent is extended or adjusted under 35 U.S.C. 154(b) by 1950 days.

(21) Appl. No.: 13/365,006

(22) Filed: Feb. 2, 2012

(65) Prior Publication Data

US 2012/0324920 A1    Dec. 27, 2012

Related U.S. Application Data

(60) Provisional application No. 61/438,819, filed on Feb. 2, 2011, provisional application No. 61/438,823, filed on Feb. 2, 2011.

(51) Int. Cl.
*F25B 45/00* (2006.01)
*B60H 1/00* (2006.01)

(52) U.S. Cl.
CPC ......... *F25B 45/00* (2013.01); *B60H 1/00585* (2013.01); *F25B 2345/001* (2013.01); *F25B 2345/006* (2013.01)

(58) Field of Classification Search
CPC .............. F25B 2345/006; F25B 45/00; F25B 2345/001; B60H 1/00585
USPC ............................................ 62/77, 292, 149
See application file for complete search history.

(56) References Cited

U.S. PATENT DOCUMENTS

| 1,420,997 | A |   | 6/1922 | Freeman |
|---|---|---|---|---|
| 1,666,283 | A |   | 4/1928 | Farley |
| 1,799,727 | A |   | 4/1931 | Byars |
| 2,001,233 | A |   | 5/1935 | Anderberg |
| 2,040,868 | A |   | 5/1936 | Moody |
| 2,285,569 | A |   | 6/1942 | Crowley |
| 2,635,623 | A |   | 4/1953 | Moffett |
| 3,131,733 | A |   | 5/1964 | Monahon |
| 3,252,475 | A |   | 5/1966 | Jones |
| 3,448,779 | A |   | 6/1969 | Horwitt |
| 3,452,906 | A |   | 7/1969 | Daniels |
| 3,717,008 | A | * | 2/1973 | Bandy .......................... 62/292 |

(Continued)

OTHER PUBLICATIONS

Copending U.S. Appl. No. 13/365,012 entitled "Systems, Methods, and Apparatus for Servicing a Refrigeration System."

(Continued)

*Primary Examiner* — Brian M King
*Assistant Examiner* — Martha Tadesse
(74) *Attorney, Agent, or Firm* — Kagan Binder, PLLC

(57) ABSTRACT

Servicing devices and methods of use for servicing refrigerant systems are described herein. The servicing device may include a body and a plunger. The body may include a first fluid port, a second fluid port, and a passage. The first fluid port operatively couples to a fluid port of a fluid source. The second fluid port operatively couples to a refrigeration system. The passage is in fluid communication with the fluid ports of the body and in fluid communication with a measuring device. A plunger is at least partially disposed in the passage of the body. A first portion of the plunger is engagable with an integrated valve of the fluid source. Adjustment of the plunger to a released position allows communication between the second fluid port and the measuring device while inhibiting communication between the first fluid port and the fluid source.

17 Claims, 11 Drawing Sheets

(56) References Cited

U.S. PATENT DOCUMENTS

| | | | |
|---|---|---|---|
| 3,759,291 A | 9/1973 | Moore et al. | |
| 3,907,012 A | 9/1975 | Burke | |
| 3,976,110 A | 8/1976 | White | |
| 4,116,245 A | 9/1978 | Ayers | |
| 4,545,759 A | 10/1985 | Giles et al. | |
| 4,644,982 A | 2/1987 | Hatch | |
| 4,694,975 A | 9/1987 | Hagan | |
| 4,903,741 A | 2/1990 | Ibanez | |
| 4,995,417 A | 2/1991 | Naku | |
| 5,070,917 A | 12/1991 | Ferris et al. | |
| 5,139,049 A * | 8/1992 | Jensen et al. | 137/614.05 |
| 5,248,125 A | 9/1993 | Fritch et al. | |
| 5,329,975 A | 7/1994 | Heitel | |
| 5,333,467 A * | 8/1994 | Pearl et al. | 62/77 |
| 5,339,862 A * | 8/1994 | Haunhorst | 137/614.05 |
| 5,355,830 A | 10/1994 | deJong | |
| RE34,781 E | 11/1994 | Spalink et al. | |
| 5,370,359 A * | 12/1994 | Sadegh et al. | 251/276 |
| 5,409,039 A * | 4/1995 | Mock | 134/34 |
| 5,586,748 A * | 12/1996 | Kish | 251/149.8 |
| 5,609,195 A | 3/1997 | Stricklin et al. | |
| 5,626,173 A | 5/1997 | Groul | |
| 5,727,776 A | 3/1998 | Gerstenberger | |
| 5,967,204 A * | 10/1999 | Ferris et al. | 141/383 |
| 6,079,444 A | 6/2000 | Harris et al. | |
| 6,089,032 A | 7/2000 | Trachtenberg | |
| 6,296,228 B1 | 10/2001 | Knowles et al. | |
| 6,360,554 B1 | 3/2002 | Trachtenberg | |
| 6,360,795 B1 | 3/2002 | Bothe et al. | |
| 6,385,986 B1 | 5/2002 | Ferris et al. | |
| 6,438,970 B1 | 8/2002 | Ferris et al. | |
| 6,442,958 B1 | 9/2002 | Knowles | |
| 6,446,453 B1 | 9/2002 | Trachtenberg | |
| 6,450,199 B1 * | 9/2002 | Haunhorst | 137/614.2 |
| 6,467,283 B1 | 10/2002 | Trachtenberg | |
| 6,481,221 B2 | 11/2002 | Ferris et al. | |
| 6,539,970 B1 | 4/2003 | Knowles et al. | |
| 6,539,988 B1 | 4/2003 | Cowen et al. | |
| 6,609,385 B1 | 8/2003 | Ferris et al. | |
| 6,637,460 B2 * | 10/2003 | Haunhorst | F16L 37/23 137/614.03 |
| 6,648,035 B1 | 11/2003 | Cowen et al. | |
| 6,698,466 B1 | 3/2004 | Cowan et al. | |
| 6,722,141 B2 | 4/2004 | Ferris et al. | |
| 6,789,581 B2 | 9/2004 | Cowen et al. | |
| 6,796,340 B1 | 9/2004 | Ferris et al. | |
| 6,851,442 B2 * | 2/2005 | Knowles et al. | 137/1 |
| 6,898,979 B2 | 5/2005 | Cowen et al. | |
| 6,978,636 B2 | 12/2005 | Motush et al. | |
| 6,981,511 B2 * | 1/2006 | Knowles et al. | 137/1 |
| 7,077,171 B2 | 7/2006 | Carrubba | |
| 7,107,781 B2 | 9/2006 | Quest et al. | |
| 7,124,598 B2 * | 10/2006 | Quest | B60H 1/00585 62/292 |
| 7,260,943 B2 | 8/2007 | Carrubba et al. | |
| 7,275,383 B2 | 10/2007 | Motush et al. | |
| 7,565,829 B2 | 7/2009 | Quest et al. | |
| 7,565,830 B2 | 7/2009 | Quest et al. | |
| 7,673,497 B2 | 3/2010 | Quest et al. | |
| 8,360,119 B2 | 1/2013 | Huang et al. | |
| 9,709,307 B2 | 7/2017 | Carrubba et al. | |
| 2003/0140971 A1 * | 7/2003 | Haunhorst | F16L 37/23 137/614.04 |
| 2004/0079092 A1 | 4/2004 | Ferris et al. | |
| 2004/0168463 A1 * | 9/2004 | Dudley | 62/292 |
| 2005/0217285 A1 * | 10/2005 | Carrubba | B60H 1/00585 62/149 |
| 2006/0006358 A1 * | 1/2006 | McGuire | B65D 90/585 251/343 |
| 2006/0086123 A1 * | 4/2006 | Quest et al. | 62/292 |
| 2006/0101839 A1 * | 5/2006 | Motush et al. | 62/292 |
| 2008/0022701 A1 | 1/2008 | Carrubba | |
| 2008/0216491 A1 * | 9/2008 | Quest | F25B 49/005 62/77 |
| 2009/0113901 A1 | 5/2009 | Carrubba | |
| 2011/0041522 A1 | 2/2011 | Carrubba | |
| 2011/0278021 A1 | 11/2011 | Travis et al. | |
| 2012/0192576 A1 * | 8/2012 | Carrubba | 62/77 |
| 2012/0324920 A1 | 12/2012 | Carrubba | |
| 2013/0118187 A1 * | 5/2013 | Carrubba | 62/77 |
| 2015/0184911 A1 | 7/2015 | Pistone et al. | |
| 2015/0308879 A1 | 10/2015 | Pistone et al. | |
| 2016/0003509 A1 | 1/2016 | Pistone et al. | |
| 2017/0284716 A1 | 10/2017 | Carrubba et al. | |

OTHER PUBLICATIONS

Inter Partes Review of U.S. Pat. No. 7,260,943, Trial No. IPR2016-00441, dated Jan. 15, 2016, Petition (67 pages).

Inter Partes Review of U.S. Pat. No. 7,260,943, Trial No. IPR2016-00442, dated Jan. 15, 2016, Petition (67 pages).

* cited by examiner

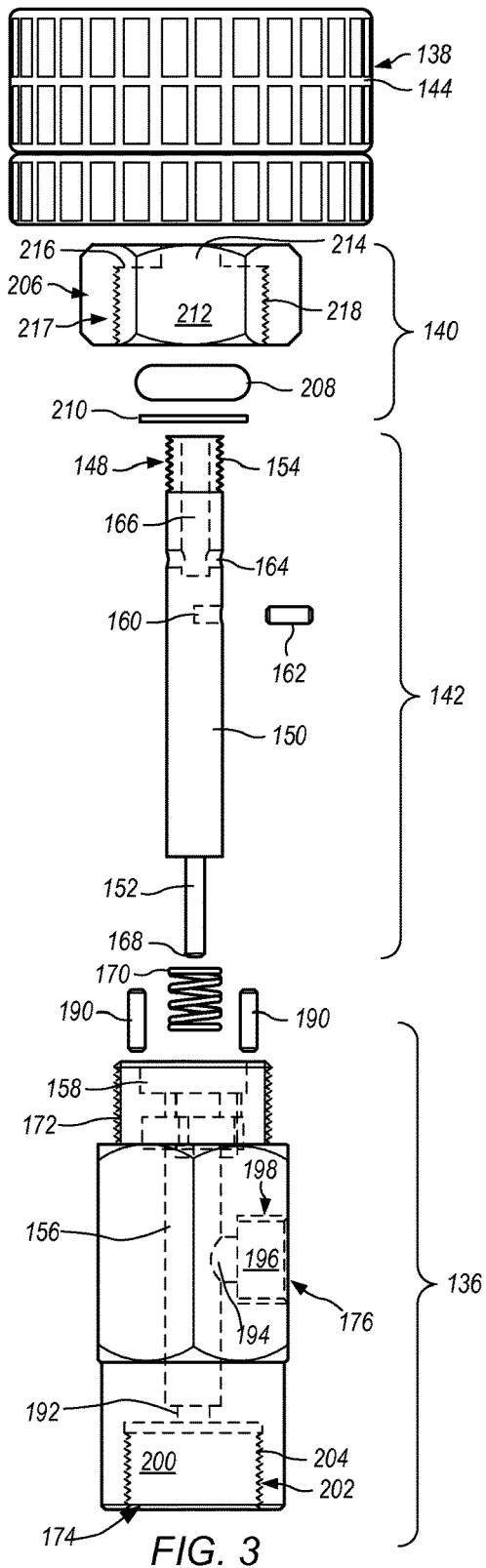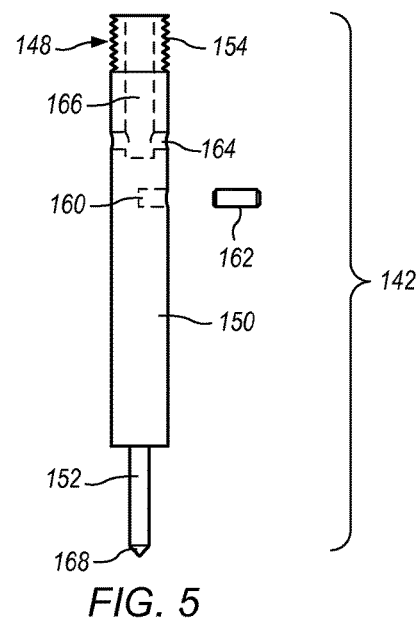
FIG. 3
FIG. 5

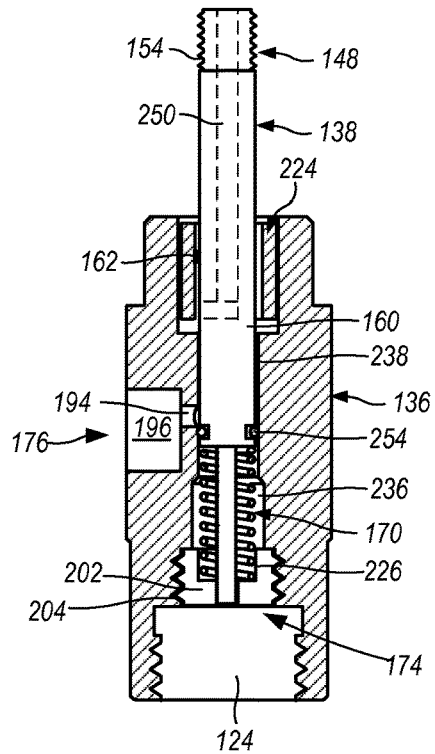
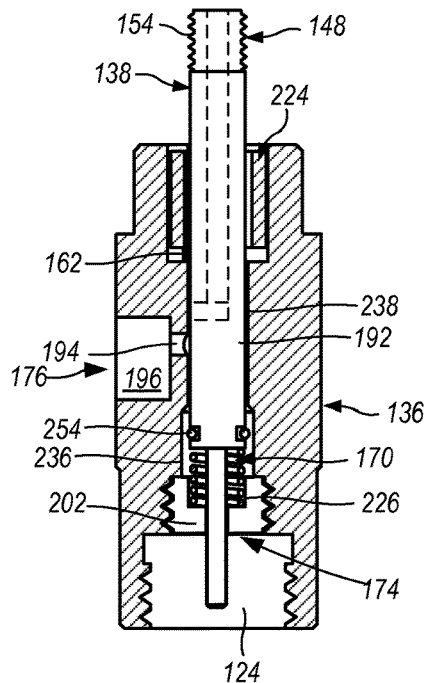
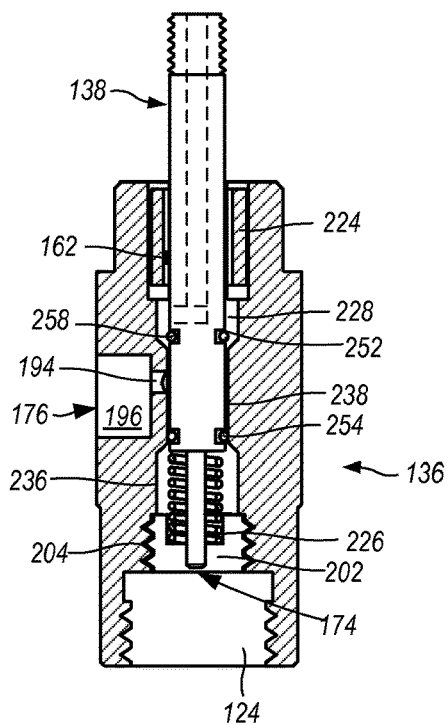
FIG. 11A
FIG. 11B
FIG. 12

SERVICING DEVICES AND METHODS OF USE THEREOF

PRIORITY CLAIM

This application claims priority to U.S. Provisional Application Ser. No. 61/438,819 entitled "VALVE TAP DEVICE AND METHODS OF USE THEREOF" to Vincent Carrubba filed Feb. 2, 2011 and U.S. Provisional Application Ser. No. 61/438,823 entitled "SYSTEMS, METHODS AND APPARATUSES FOR SERVICING A REFRIGERATION SYSTEM" to Vincent Carrubba filed Feb. 2, 2011, each of which are incorporated herein by reference.

BACKGROUND

1. Field of the Invention

The present invention generally relates to the field of servicing devices. In particular, embodiments relate to servicing devices for operating self-sealing valves.

2. Description of the Related Art

Refrigeration systems (e.g., air-conditioning (A/C) systems) typically include a liquid or gaseous refrigerant that is used for cooling. Servicing a refrigeration system (for example, an automobile refrigerant system, a residential refrigerant system, or a commercial refrigeration system) often includes charging the system with a refrigerant (for example, halogenated hydrocarbons, and/or other coolants). In the case of charging an automobile refrigerant system, a pressurized refrigerant source, such as an aerosol can of refrigerant, connects via a hose to a low-pressure port of refrigerant lines carrying refrigerant within the system. While connected, the refrigerant may expel from the refrigerant source and is injected or drawn into the refrigerant lines. Refrigerant may be added until a desired pressure/volume of refrigerant is provided into the system.

The flow of refrigerant from the refrigerant source is typically regulated via a valve. In the case of an aerosol can of refrigerant, a valve is often threaded or otherwise attached to an outlet at a top end of the container. In certain aerosol systems, an integrated valve (for example, a self-sealing valve (SSV)) is provided at an outlet of the container. In some aerosol systems, the integrated valve may include a spring-loaded gating device that is depressed to open and close the container. To stop the flow of fluid, the gating device is released, closing the integrated valve, thereby stopping or reducing the flow of fluid.

U.S. Pat. No. 7,260,943 to Carrubba et al. and U.S. Patent Application Publication Nos. 2008-0022701 to Carrubba et al. and 2009-0113901 to Carrubba et al., which are incorporated herein by reference as fully set forth herein, describe various apparatus that may allow a consumer to measure the refrigerant pressure in an automobile air conditioner and to add refrigerant as needed.

Many servicing devices for aerosol products, as well as containers having integrated valves, have become common in the art. Such devices, however, have not typically been adapted for use with certain types of products, such as automotive refrigerants. As environmental regulations change, it is believed that use of integrated valves (e.g., self-sealing valves) may become more common in many, if not all, types of aerosol products. Accordingly, there may be a need for devices that enable efficient operation of integrated valves in a variety of applications relating to servicing refrigeration systems.

SUMMARY

Methods, systems, and devices for servicing a refrigeration system are described herein. In some embodiments, a device for servicing a refrigeration system includes a body and a plunger. The body includes a first fluid port, a second fluid port, and a passage. The first fluid port operatively couples to a fluid port of a fluid source. The second fluid port operatively couples to a refrigeration system. The passage is in fluid communication with the first and second fluid ports and a measuring device. The plunger is at least partially disposed in the passage of the body and a first portion of the plunger is engagable with an integrated valve of the fluid source. Adjustment of the plunger to the released position during use allows communication between the second fluid port and the measuring device, while inhibiting communication between the first fluid port and the fluid source.

In some embodiments, a device for servicing a refrigeration system includes a body and a plunger. The body includes one or more fluid ports and a passage. The passage is in fluid communication with the fluid ports during use. At least one of the fluid ports of the body being coupled to a fluid port of a fluid source during use. The fluid source includes a self-sealing valve adjustable between an opened position and a closed position. The plunger is disposed in the passage of the body during use. The plunger is adjustable between a released position and an engaged position, such that when the plunger is adjusted to the released position, the self-sealing valve is simultaneously adjusted to the closed position, and when the plunger is adjusted to the engaged position, the self-sealing valve is simultaneously adjusted to the opened position. The plunger is further adjustable between a locked position and an unlocked position, such that when the plunger is adjusted to the locked position, the self-sealing valve is suspended in the opened position to allow continuous fluid communication between the fluid source and the body.

In some embodiments, a device includes a body, an insert, a measuring device, and a plunger. The body includes a first fluid port, a second fluid port, and a passage. The first fluid port operatively couples to a fluid port of a fluid that includes a seal. The passage is in fluid communication with the first and second fluid ports of the body during use. The insert and the plunger are at least partially disposed in the passage of the body. A first portion of the plunger is engaged with a portion of the seal of the fluid source during use, and a second portion of the plunger is engaged with the opening of the insert during use. The plunger is adjustable between a released position and an engaged position. Adjustment of the plunger to the released position allows communication between the second fluid port and the measuring device while inhibiting communication between the first fluid port and the fluid source.

In some embodiments, a method of servicing a refrigeration system includes providing a first fluid port of the device to a fluid port of the fluid source, providing a second fluid port of the servicing device to a fluid port of a refrigeration system, adjusting the self-sealing valve from a closed position to an opened position by engaging an end of a plunger of the servicing device with a self-sealing valve of the fluid source; engaging a second portion of the plunger with a portion of a body of the servicing device to inhibit axial movement of the plunger; and allowing continuous fluid flow between the fluid source, through the body of the servicing device, and then to the refrigeration system.

In some embodiments, a device for servicing a refrigerant system includes a housing, a measuring device, a body and a valve. The body and the measuring device are positioned in the housing. The body includes a first fluid port, a second fluid coupling member, and a passage in fluid communication with the first and second fluid ports. The first fluid port is couplable to a fluid port of a fluid source and the second fluid coupling member operatively couples to the measuring device and to a refrigerant receiving system. The valve is at least partially disposed in the passage of the body, and a first portion of the valve is engagable with an integrated valve of the fluid source. The valve is adjustable between a released position and an engaged position and adjustment of the valve to the released position during use allows communication between the measuring device and receiving system while inhibiting communication between the first fluid port and the fluid source. In some embodiments, a check valve is coupled to the body. The check valve inhibits flow from the receiving system to the fluid source during use.

In some embodiments, a method of servicing a refrigeration system includes providing a servicing device to a refrigerant system; engaging a portion of a valve of the servicing device with an integrated valve of a fluid source to allow fluid communication between the refrigeration system the fluid source; and measuring one or more parameters of the refrigerating system by actuating a valve of the servicing device such that fluid communication between the fluid source and the refrigerant source and a measuring device contained is inhibited while allowing fluid communication between the refrigerant source and the measuring device.

In some embodiments, kits that include apparatus and/or devices for servicing refrigeration systems are described herein.

In further embodiments, additional features may be added to the specific embodiments described herein.

BRIEF DESCRIPTION OF THE DRAWINGS

The present invention will be better understood and other advantages will appear on reading the detailed description of some embodiments taken as non-limiting examples and illustrated by the following drawings.

FIG. 3 is an exploded side view of an embodiment of a servicing device.

FIG. 5 is a perspective view of an embodiment of a plunger.

FIGS. 11A and 12B are cross-sectional side views of servicing device depicted in FIG. 10 during use.

FIG. 12 is a cross-sectional side view of another embodiment of the servicing device with sealing members.

Figure 1:
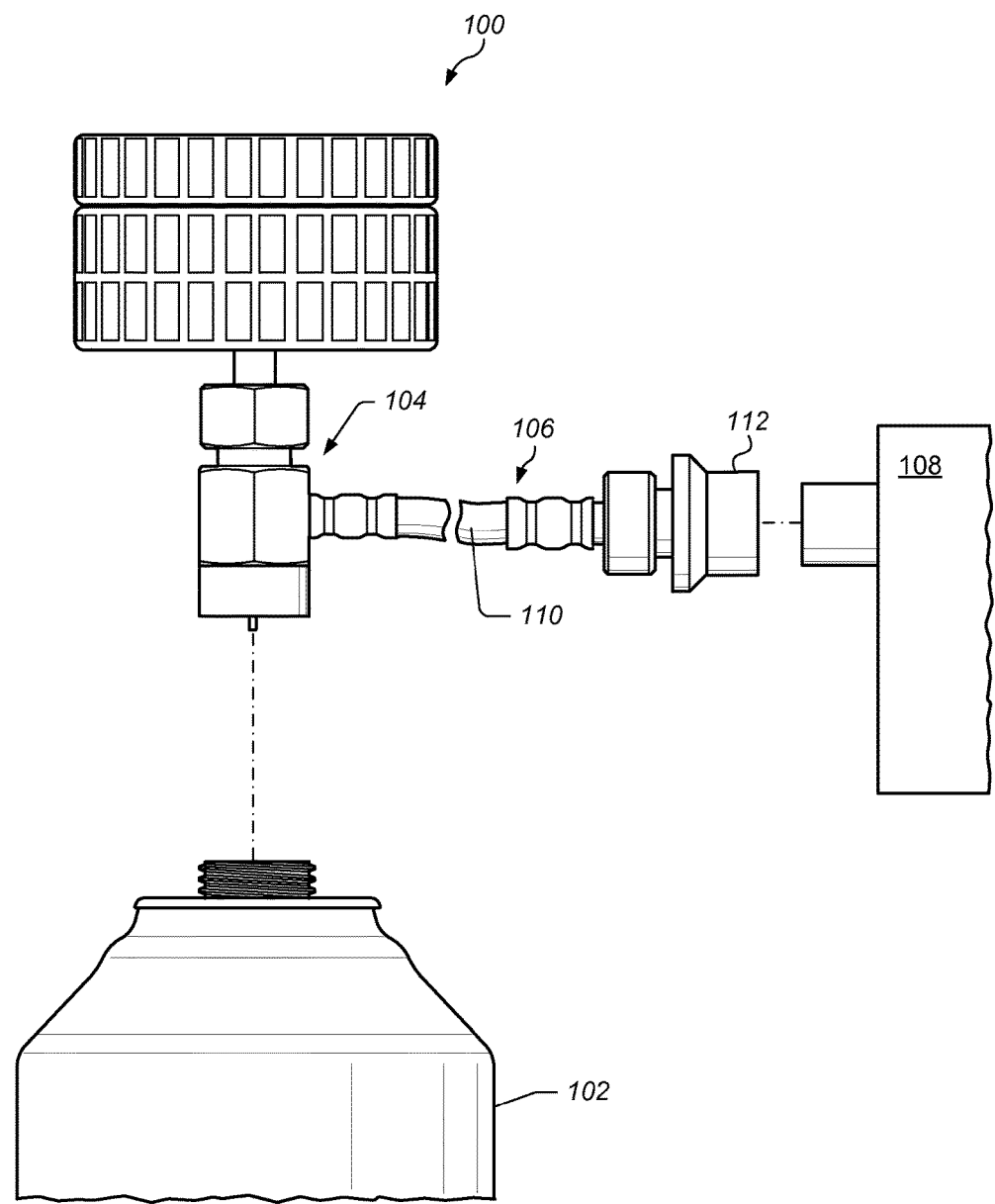
FIG. 1 is a schematic view of an embodiment of a fluid routing system.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

It is to be understood that the present invention is not limited to particular devices or methods, which may, of course, vary. It is also to be understood that the terminology used herein is for describing particular embodiments only, and is not intended to be limiting. As used in this specification and the appended claims, the singular forms "a", "an", and "the" include singular and plural referents unless the content clearly dictates otherwise. Thus, for example, reference to "a fluid" may include a combination of two or more fluids. Furthermore, the word "may" is used throughout this application in a permissive sense (i.e., having the potential to, being able to), not in a mandatory sense (i.e., must). The term "include," and derivations thereof, mean "including, but not limited to." Terms relating to orientation, such as "upper", "lower", "top", "bottom", "left", or "right", are used for reference only; the device herein may be used in any orientation. The order of any method may be changed, and various elements may be added, reordered, combined, omitted, modified, etc.

"Bias member" refers to any member of the system, device, or apparatus that exerts a force in a particular direction(s).

"Body" refers to any physical structure capable of at least partially supporting another object. A body may have various regular or irregular shapes. For example, portions of a body may be straight, curved, or a combination of both.

"Charging" refers to both charging and recharging of a system. Charging a system may include initially filling a unit with fluid (for example, refrigerant). Recharging may refer to adding fluid to a unit that has some fluid in the unit. Recharging may be performed after a portion of the fluid has leaked out of the unit or the pressure/amount of the fluid has dropped below a desirable level. It will be appreciated that charging and recharging are often used interchangeably.

"Coupled" means either a direct connection or an indirect connection (e.g., one or more intervening connections) between one or more objects or components. The phrase "directly connected" means a direct connection between objects or components such that the objects or components are connected directly to each other so that the objects or components operate in a "point of use" manner.

"Coupling element" refers to any physical structure or combination of structures capable of releasably or permanently connecting two objects. Examples of a coupling element include, but are not limited to, a hook, a clip, a clasp, mating threads, one or more members of an interference fitting, one or more members of a welded joint, one or more members of a quick coupling joint, and any combination of such elements.

"Fluid" refers to a liquid, gas, vapor, or a mixture thereof.

"Member" refers to a constituent part of a system. A member may include a plate, link, rod, or other structure of various sizes, shapes, and forms. A member may be a single component or a combination of components coupled to one another. A member may have various regular or irregular shapes. For example, portions of a member may be straight, curved, or a combination of both.

"Opening" refers to an aperture, such as a hole, gap, slit, or slot.

In some embodiments, a servicing device is connected to a fluid source and a fluid receiving system. The fluid source may include a self-sealing valve. The servicing device is capable of allowing fluid communication between the fluid source and the fluid receiving system. The servicing device may include a plunger that is capable of engaging the self-sealing valve. Use of a servicing device that couples directly to a fluid source and engages with a self-sealing valve may eliminate the need for adaptors used to adapt conventional valves to refrigerant containers having integrated valves. In some embodiments, the servicing device is capable of being locked in an open position during use.

In some embodiments, the servicing device includes a measuring device. The servicing device may allow fluid communication between the measuring device and the fluid receiving system while inhibiting fluid communication between the fluid source and the measuring device and/or the fluid receiving system.

FIG. 1 is a schematic view of an embodiment of a fluid routing system. Fluid routing system 100 may include one or more valves, hoses, pressure gauges, check valves, flexible or rigid conduits, adapters, or combinations thereof. Fluid routing system 100 includes fluid source 102, servicing device 104, fluid transfer member 106, and fluid receiving system 108. Fluid source 102 may be coupled to fluid receiving system 108 via servicing device 104 and fluid transfer member 106. As shown, fluid source 102 is connected to servicing device 104, the servicing device is connected to fluid transfer member 106, and the fluid transfer member is connected to fluid receiving system 108.

In some embodiments, fluid routing system 100 is capable of transferring fluid from fluid source 102 to fluid receiving system 108. For example, fluid source 102 may have an internal pressure sufficiently greater than that of fluid receiving system 108 such that fluid flows from the fluid source to the fluid receiving system. In certain embodiments, a refrigerant may be added to a refrigeration system using one or more components of fluid routing system 100.

Fluid source 102 may include a volume of hydrocarbons, halogenated hydrocarbons, or mixtures thereof. In some embodiments, fluid source may include ammonia and/or water. Halogenated hydrocarbons include, but are not limited to, fluorinated hydrocarbons, chlorinated, fluorinated hydrocarbons, fluorinated ethers, 2,3,3,3-tetrafluorprop-1-ene (HFO-1234yf), 1,1,1,2-tetrafluorethane, dichlorodifluoromethane, or mixtures thereof. Commercially available fluid sources include, but are not limited to, HFO-1234yf refrigerants (for example, Genetron® (Honeywell, USA), Opteon™ (DuPont™, USA), R-134a, R-12, or the like. In some embodiments, fluid source 102 may also include other suitable chemicals including, but not limited to, dyes and/or system lubricants.

Fluid source 102 may be any suitable shape or size and/or may be composed of one or more suitable materials. Fluid source 102 may have a shape that is easily grasped by a human hand, sufficient size to contain a desired volume of fluid; and/or may be composed of a material having sufficient mechanical properties to withstand the static force of a pressurized fluid.

In certain embodiments, fluid source 102 is a portable container. A portable container includes, but is not limited to, a can, a cylinder, or a reservoir that is easily handled by a user. In some embodiments, fluid source 102 includes, but is not limited to, a stationary reservoir, such as a large tank or similar container. Fluid source 102 may be pressurized or, in some embodiments, under a vacuum. In some embodiments, fluid source 102 is at atmospheric pressure. In an embodiment, fluid source 102 is an aerosol container of R-134a refrigerant or HFO1234fy refrigerant. Fluid source 102 may include an integrated valve or a seal that requires puncturing in order to be opened. In some embodiments, fluid routing system 100 may alternatively, or additionally, be configured to transfer fluid from fluid receiving system 108 to fluid source 102.

Fluid transfer member 106 may include fluid transfer body 110. Fluid transfer body 110 may include any device or structure capable of supporting fluid flow. For example, fluid transfer body 110 may include, but is not limited to, a flexible or rigid hose, conduit, pipe, tube, and the like. For example, a hose with appropriate couplings connects to servicing device 104 and an inlet of a refrigeration system. Fluid transfer body 110 may include openings of any suitable shape or size to allow pressurized fluid to enter and/or exit the fluid transfer body at a desired rate of flow. An end of fluid transfer body 110 may include a coupling element (not shown) at least substantially complementary to a coupling element of servicing device 104.

An opposite end of fluid transfer body 110 may be coupled to a fluid port of fluid receiving system 108. In some embodiments, an end of fluid transfer body 110 includes a coupling element for coupling fluid transfer member 106 to an external device or structure. As shown, fluid transfer body includes quick coupling member 112. Quick coupling member 112 may be at least substantially complementary to a quick coupling member of fluid receiving system 108.

Fluid receiving system 108 may include, but is not limited to, an automobile refrigerant system, a residential refrigerant system, a commercial refrigeration system, or the like. In some embodiments, fluid receiving system 108 is an automobile refrigerant system. The automobile refrigerant system may include an automobile air-conditioning (A/C) system. In some embodiments, a refrigeration system may include an evaporator, condenser, and compressor that circulates refrigerant to cool or otherwise transfer/remove heat from the respective environment.

Adding of fluid to fluid receiving system 108 may charge or recharge the unit. In some embodiments, fluid routing system 100 is used to charge or recharge a refrigeration system (for example, charging an automobile refrigeration system using a can of refrigerant).

Figure 2:
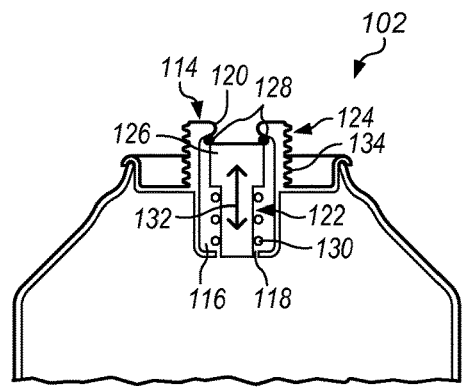
FIG. 2 is a cut away side view of an embodiment of a fluid source.

FIG. 2 is a cut away side view of fluid source 102. Fluid source 102 may include fluid source port 114. Fluid source port 114 may function as an inlet and/or an outlet. For example, fluid source port 114 may allow fluid to enter and/or exit fluid source 102. Fluid source port 114 may include bore 116, opening 118, annular lip 120, integrated valve 122, and coupling element 124. Bore 116 may be any suitable shape or size. For example, bore 116 may be at least of sufficient size to receive integrated valve 122. Opening 118 may be any suitable shape or size. For example, opening 118 may be at least of sufficient size to allow pressurized fluid to enter and/or exit fluid source 102 at a desired rate of flow.

Integrated valve 122 may be disposed in bore 116. Integrated valve 122 may be adjustable between an opened position (as referenced herein, an opened position includes any position in which a fluid is allowed to exit or enter fluid source 102) and a closed position (as referenced herein, a closed position includes any position in which a fluid is inhibited from exiting or entering fluid source 102). Integrated valve 122 may be adjusted between the closed position and the opened position to regulate the flow and/or pressure of fluid being transferred to or from fluid source 102.

In some embodiments, integrated valve 122 is a self-sealing valve. For example, integrated valve 122 may include gating device 126, sealing members 128, and bias member 130. The position of gating device 126 may be manipulated to adjust integrated valve 122 between an opened position and a closed position. For example, gating device 126 translates longitudinally as shown by arrow 132. Bias member 130 may urge gating device 126 longitudinally towards annular lip 120. In some embodiments, bias member 130 includes a coiled spring. Gating device 126 may engage and/or manipulated by an external device. For example, gating device 126 engages and/or is manipulated by a plunger of servicing device 104. In some embodiments, gating device 126 and the external device have complimentary dimensions. Sealing members 128 may couple to gating device 126. Integrated valve 122 may be in a closed position when sealing member 128 is pressed against an inside surface of annular lip 120. Sealing member 128 may seal against the inside surface of annular lip 120 such that the unintentional release of fluid from the interior of fluid source 102 is inhibited. Integrated valve 122 may be adjusted to an opened position from the closed position when gating device 126 is translated longitudinally away from annular lip 120. Translating gating device 126 away from annular lip 120 may allow fluid to flow from the interior of fluid source 102 through bore 116 of fluid source port 114.

In some embodiments, fluid source port 114 is coupled to an adapter, valve, servicing device, hose, or the like. In certain embodiments, fluid source port 114 is coupled to a fluid port of servicing device 104. The coupling between fluid source port 114 and the fluid port of servicing device 104 may be least substantially fluid tight. That is, little or no fluid may be allowed to escape fluid routing system 100 through the coupling of fluid source port 114 and the fluid port of servicing device 104. Fluid source port 114 may permanently or temporarily couple to a fluid port of servicing device 104.

Coupling element 124 may couple fluid source 102 to an external device or structure. As shown, coupling element 124 includes exterior threads 134 arranged in a selected thread pattern. In some embodiments, a selected thread pattern includes a universal ACME or ISO metric thread pattern engageable with any object or structure having a similar universal thread pattern. For example, a selected thread pattern may include a 0.5 inch (about 1.27 cm) ACME internal thread or an ISO metric trapezoidal thread having a 30° thread angle. In certain other embodiments, a selected thread pattern includes a unique thread pattern engageable only with selected objects or structures having the unique thread pattern. For example, in some embodiments, exterior threads 134 are arranged in a unique thread pattern engageable only with the interior threads of one or more components of fluid routing system 100. In some embodiments, coupling element 124 is at least substantially complementary to a coupling element of servicing device 104. For example, exterior threads 134 may be at least substantially complementary to a set of interior threads of servicing device 104.

Figure 4:
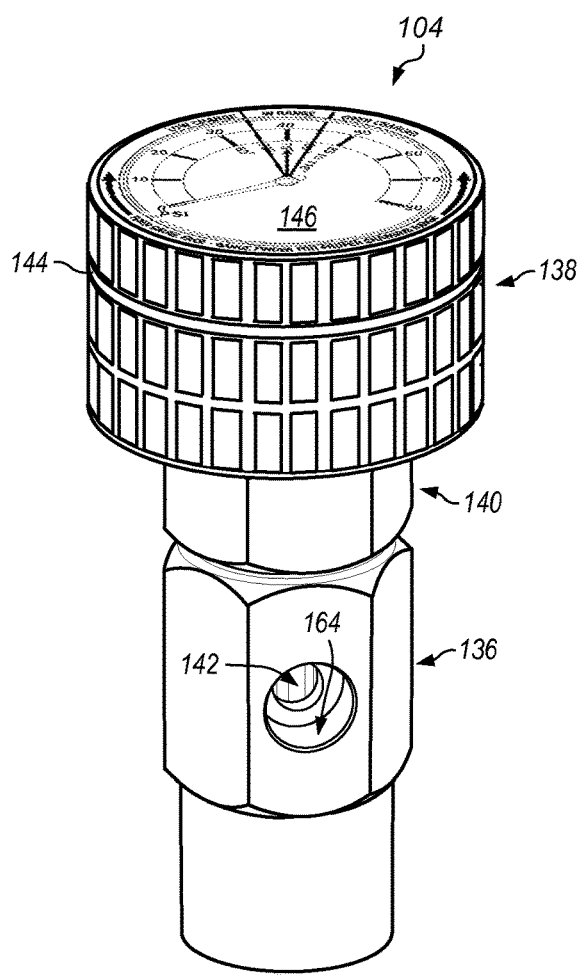
FIG. 4 is a perspective view of an embodiment of the servicing device depicted in FIG. 3 assembled.
Figure 6:
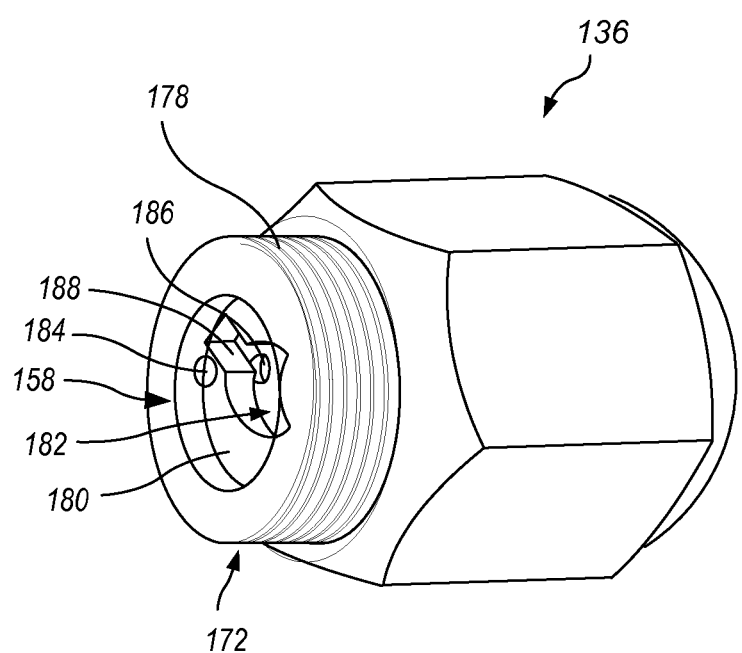
FIG. 6 is a perspective view of an embodiment of servicing device body.

FIGS. 3-6 depict embodiments of servicing device 104. FIG. 3 is an exploded side view of an embodiment of servicing device 104. FIG. 4 is a perspective view of servicing device 104 connected to a measuring device. FIG. 5 is a perspective view of an embodiment of a plunger of servicing device 104. FIG. 6 is a perspective view of an embodiment of servicing device body 136.

Referring to FIGS. 3 and 4, servicing device 104 may include actuator 138, coupling member 140, plunger 142, and servicing device body 136. Actuator 138 may be permanently or releasably coupled to plunger 142. Actuator 138 may include handle 144 and/or measuring device 146. Handle 144 may include any physical features (for example, ridges, non-slip coating, etc.) that facilitate gripping and/or handling. In some embodiments, the handle may include gripping elements and an opening (not shown). The opening may include a coupling element for coupling handle 144 to an external device or structure. For example, the coupling element may include a set of interior threads arranged in a selected thread pattern. In some embodiments, the coupling element of handle 144 is at least substantially complementary to a coupling element of plunger 142. For example, the set of interior threads of handle 144 may be at least substantially complementary to exterior threads of plunger 142. During use, actuator 138 may be utilized to actuate servicing device 104. For example, a user grasps or manipulates handle 144 to adjust integrated valve 122 from a closed position to an opened position or vice versa when servicing device 104 is coupled to fluid source 102.

In some embodiments, actuator 138 (handle) may be integrated with measuring device 146 (shown in FIG. 4). Measuring device 146 may include, but is not limited to, a pressure gauge, a temperature gauge, and/or one or more similar devices. In some embodiments, actuator 138 is in fluid communication with servicing device body 136, such that the measuring device may provide fluid property readings (for example, temperature and/or pressure readings, etc.) in connection with the fluid flowing through or suspended in servicing device body 136. For example, measuring device 146 may provide fluid property readings in connection with fluid receiving system 108. In certain embodiments, measuring device 146 may provide fluid property readings in connection with fluid source 102.

Actuator 138 may be directly coupled, releasably coupled, or an integral part of plunger 142. Plunger 142 includes coupling element 148, plunger body 150, and plunger shaft 152. Coupling element 148 may releasably couple plunger 142 to an external device or structure (for example, actuator 138). Coupling element 148 may directly couple (for example, glued or welded) or be integral with plunger body 150. Coupling element 148 may include exterior threads arranged in a selected pattern. In some embodiments, coupling element 148 is at least substantially complementary to a coupling element of actuator 138. For example, exterior threads of coupling element 148 of may be at least substantially complementary to a set of interior threads of handle 144.

Plunger body 150 may be any suitable shape or size. For example, plunger body 150 may be at least substantially cylindrical. In some embodiments, plunger body 150 is at least partially disposed in bore 156 of servicing device body 136. Plunger body 150 may be inserted through opening 158 such that at least a portion of the plunger body is disposed in bore 156. Opening 158 may allow fluid communication between second fluid port 176 and with measuring device 146. The diameter of plunger body 150 may be at most slightly less than the diameter of bore 156 such that an annulus is formed between an outer surface of the plunger body and an inner surface of the bore. The annulus may be in fluid communication with fluid receiving system 108 and fluid source 102. In some embodiments, a fluid may flow in a substantially axial direction through the annulus. Fluid may flow from fluid source 102 through bore 156 and then to fluid receiving system 108.

Plunger body 150 may include radial opening 160, radial protrusion 162, radial passage 164, and passage 166. Radial opening 160 may be any suitable shape or size. Radial opening 160 may be at least substantially circular having a diameter of sufficient size to receive at least a portion of radial protrusion 162. In some embodiments, when plunger body 150 is at least partially disposed in bore 156, radial passage 164 may be in fluid communication with the annulus formed between the outer surface of the plunger body and the inner surface of the bore. Plunger passage 166 may be in fluid communication with radial passage 164. For example, axial passage 166 may intersect radial passage 164. In some embodiments, radial passage may allow fluid to vent from servicing device 104 and/or measuring device 146 when plunger 142 is disengaged.

Plunger body 150 may be directly coupled (for example, welded or glued) or integral with plunger shaft 152. Plunger shaft 152 may be permanently or releasably coupled to plunger body 150. Plunger shaft 152 may be any suitable shape or size. Plunger shaft 152 may be at least substantially cylindrical, and have a diameter at least slightly less than the smallest diameter of bore 156. A portion of plunger shaft 152 may be engageable with at least a portion of integrated valve 122. For example, plunger shaft 152 may include end 168 having an end surface at least substantially complementary to gating device 126 of integrated valve 122. In some embodiments, plunger end 168 includes a blunt end surface for pressing against gating device 126 of integrated valve 122. In some embodiments, engaging a portion of plunger end 168 with the portion of integrated valve 122 adjusts the integrated valve from a closed position to an opened position. Opening of integrated valve 122 allows fluid to flow from fluid source 102 through bore 156 and then to fluid receiving system 108.

In some embodiments, simultaneous engagement of the first portion of plunger 142 with integrated valve 122, and the second portion of the plunger with servicing device body 136 and/or an additional member of servicing device 104 suspends the integrated valve in an opened position to allow continuous fluid communication between fluid source 102 and the servicing device body. In certain embodiments, simultaneous engagement of the first and second portions of plunger 142 as described above allows continuous fluid communication between fluid source 102 and fluid receiving system 108 through servicing device 104. For example, pressing plunger end 168 against gating device 126 of integrated valve 122 with sufficient force may adjust the integrated valve from a closed position to an opened position. In some embodiments, disengaging plunger end 168 from the portion of integrated valve 122 may adjust the integrated valve from an opened position to a closed position.

As shown in FIG. 5, plunger end 168 includes a tapered end configured to break a seal of a fluid source by piercing a hole in the seal. In some embodiments, the taper end may be sharp. For example, the tapered end may be used for piercing a hole in a seal of a refrigerant container having an ACME type top. In some embodiments, force may be applied to the plunger to assist in piercing a seal of a refrigerant container to open the container to allow fluid to flow from first fluid source 102 through servicing device 104, and then to fluid receiving system 108. In some embodiments, the plunger end 168 and/or plunger shaft 152 are hollow.

Plunger 142 may include bias member 170. In some embodiments, bias member 170 includes a spring element. Bias member 170 may exert a force against at least a portion of plunger 142. Bias member 170 may also exert a force against at least a portion of servicing device body 136. In some embodiments, bias member 170 exerts substantially equal and opposite forces on respective portions of plunger 142 and servicing device body 136. As shown, bias member 170 is disposed axially between plunger body 150 and servicing device body 136. In some embodiments, bias member 170 urges plunger 142 apart from a surface of servicing device body 136. During use, when servicing device 104 is coupled to fluid source 102, bias member 170 may urge plunger shaft 152 apart from integrated valve 122. Such separation may inhibit unintentional opening of the integrated valve 122.

Plunger 142 may be inserted into servicing device body 136. Referring to FIG. 3 and FIG. 6, servicing device body may include opening 158, coupling element 172, bore 156, first fluid port 174, and second fluid port 176. Servicing device body 136 may be any suitable shape or size. As shown, servicing device body 136 has an elongated, irregular shape. In some embodiments, at least one of the fluid ports may be coupled to fluid source port 114 of fluid source 102.

Opening 158 may be any suitable shape or size. In some embodiments, opening 158 is at least of sufficient size to receive plunger 142. As shown, opening 158 is at least substantially circular having a diameter of sufficient size to receive the body of plunger 142 and radial protrusion 162 of plunger 142. In some embodiments, opening 158 extends at least substantially in an axial direction through servicing device body 136.

As shown in FIG. 6, coupling element 172 includes exterior threads 178, annular shoulder 180, annular groove 182, axial grooves 184, and holes 186. Coupling element 172 may be permanently or releasably coupled to coupling member 140 with exterior threads 178. Threads 178 may be arranged in a selected pattern. In some embodiments, coupling element 172 is at least substantially complementary to coupling member 140. For example, threads 178 of are at least substantially complementary to a set of interior threads of coupling member 140.

Annular shoulder 180 may include radial slot 188. Radial slot 188 may be any suitable shape or size. In some embodiments, radial slot 188 is at least of sufficient size to receive radial protrusion 162 of plunger 142. For example, radial protrusion 162 may pass through radial slot 188 in a substantially axial direction when plunger 142 is inserted in servicing device body 136.

Annular groove 182 may be any suitable shape or size. In some embodiments, annular groove 182 is at least of sufficient size to receive radial protrusion 162. In some embodiments, radial protrusion 162 may be displaced angularly within annular groove 182. For example, axial rotation of plunger 142 may alter the angular position of radial protrusion 162 within annular groove 182 during use.

Axial grooves 184 and holes 186 may be any suitable shape or size. In some embodiments, axial grooves 184 and holes 186 are at least of sufficient size to receive respective portions of pins 190 (Shown in FIGS. 3, 7 and 8). As shown, axial grooves 184 are at least substantially cylindrical having a diameter at least slightly larger than the diameter of pins 190. Holes 186 may be at least substantially circular having an open end for receiving pins 190 and a closed end for the supporting the pins.

Pins 190 (inhibitors) may be disposed in axial grooves 184 and holes 186 of servicing device body 136. During use, when plunger body 150 is at least partially disposed in bore 156 and radial protrusion 162 is disposed in annular groove 182, pins 190 may limit the angular range of rotation of plunger 142. As shown, pins 190 pass through annular groove 182, thereby obstructing the angular path of radial protrusion 162 during use. In some embodiments, pins 190 may limit the angular range of rotation of plunger 142 to at least about 10°. In certain embodiments, pins 190 may limit the angular range of rotation of plunger 142 to at most about 180°.

Plunger 142 may be adjustable between a released position and an engaged position. In some embodiments, when plunger 142 is adjusted to the released position, integrated valve 122 is simultaneously adjusted to a closed position. In some embodiments, when plunger 142 is adjusted to the engaged position, integrated valve 122 is simultaneously adjusted to an opened position.

Referring to FIG. 3, coupling element 172 may be affixed or an integral part of servicing device body 136. Coupling element 172 may have an outer diameter that is less than the outer diameter of the servicing device body. Bore 156 may extend at least substantially in an axial direction through the interior of coupling element 172, servicing device body 136, and first fluid port 174. Bore 156 may include a passage of any suitable shape or size. In some embodiments, bore 156 is at least of sufficient size to receive at least a portion of plunger 142. As shown, bore 156 is at least substantially cylindrical having a diameter at least slightly larger than the diameter of the body of plunger 142. A diameter of bore 156 may be reduced as the bore enters fluid port 174. Such a reduction may form neck 192. Neck 192 may assist in directing flow into valve body 136 from fluid source 102.

Bore 156 may be in fluid communication with second fluid port 176 via passage 194. Second fluid port 176 may function as an inlet and/or an outlet. For example, second fluid port 176 may allow fluid to enter and/or exit servicing device body 136. Passage 194 may be any suitable shape or size. As shown, passage 194 is at least substantially cylindrical.

Second fluid port 176 may include bore 196 and coupling element 198. Bore 196 may be any suitable shape or size. For example, bore 196 may be at least substantially circular having a diameter of sufficient size to allow pressurized fluid to enter and/or exit servicing device body 136 at a desired rate of flow.

Coupling element 198 may be configured to couple servicing device 104 to an external device or structure. Servicing device 104 may be permanently or releasably coupled to fluid transfer member 106. In some embodiments, coupling element 198 is at least substantially complementary to a coupling element of fluid transfer member 106. For example, coupling element 198 may include an interior surface weldable to an exterior surface of fluid transfer member 106. In some embodiments, coupling element 198 may be threads in bore 196 that are complimentary to one or more coupling members (for example, a hose fitting, and/or adaptor).

Bore 156 may be in fluid communication with first fluid port 174. First fluid port 174 may function as an inlet and/or an outlet. For example, first fluid port 174 may allow fluid to enter and/or exit servicing device body 136. First fluid port 174 may include bore 200 and coupling element 202. Bore 200 may be any suitable shape or size. For example, bore 200 may be at least substantially cylindrical having a diameter of sufficient size to allow pressurized fluid to enter and/or exit servicing device body 136 at a desired rate of flow.

Coupling element 202 may be configured to couple servicing device 104 to an external device or structure. Servicing device 104 may be permanently or releasably coupled to fluid source port 114 with coupling element 202. As shown, coupling element 202 includes threads 204. Threads 204 may be arranged in a selected thread pattern. In some embodiments, coupling element 202 is at least substantially complementary to coupling element 124 of fluid source port 114. For example, interior threads 204 may be at least substantially complementary to exterior threads 134 of fluid source port 114.

After plunger 142 is inserted in servicing device body 136, coupling member 140 may be used to inhibit the unintentional release of fluid and/or plunger 142 from servicing device body 136. Coupling member 140 may include any suitable components. As shown, coupling member 140 includes nut 206, first gasket 208, and second gasket 210.

Nut 206 may couple to servicing device body 136. Nut 206 may include first bore 212, second bore 214, and annular shoulder 216. First bore 212 may be any suitable shape or size. First bore 212 may be at least substantially cylindrical having a diameter of sufficient size to receive at least a portion of servicing device body 136. First bore 212 includes coupling element 217 for coupling nut 206 to servicing device body 136. Coupling element 217 may include interior threads 218 arranged in a selected pattern. In some embodiments, threads 218 are at least substantially complementary to threads of a coupling element of servicing device body 136.

First bore 212 may include second bore or neck 214. Second bore 214 may be any suitable shape or size. For example, as shown in FIG. 3, second bore 214 is at least substantially cylindrical having a diameter of sufficient size to receive at least a portion of plunger 142. In some embodiments, the diameter of second bore 214 is at least slightly larger than the diameter of a portion of plunger 142. In some embodiments, the diameter of second bore 214 is sufficient to allow substantially uninhibited axial movement of plunger 142 through nut 206 and into servicing device body 136. Union of first bore 212 and second bore 214 forms shoulder 216. Annular shoulder 216 may inhibit plunger 142 from passing through nut 206 and out of servicing device body 136, when servicing device 104 is disconnected from actuator 138.

First gasket 208 and second gasket 210 may be disposed in nut 206. Gaskets 208 and 210 may at least partially seal servicing device body 136 such that the unintentional release of a fluid from servicing device 104 is inhibited. In some embodiments, first gasket 208 is an o-ring gasket. In some embodiments, gaskets 208 and/or 210 are composed of one or more materials that are chemically inert to the fluid flowing through portions of servicing device 104. For example, first gasket 208 may be composed of a rubber and second gasket 210 may be composed of a metallic compound (e.g., stainless steel or aluminum). In some embodiments, a surface of radial protrusion 162 may abut gasket 210 to inhibit plunger 142 from sliding out of servicing device body 136.

In some embodiments, servicing device 104 may be assembled by inserting plunger 142 in servicing device body 136 and tightening nut 206 of coupling member 140 to coupling element 172 of servicing device body 136. Plunger 142 may be then coupled to actuator 138. Actuator 138 may move plunger 142 to an opened or closed position. For example, FIG. 4 depicts an embodiment of assembled servicing device 104 that includes a pressure gauge.

Figures 7, 8:
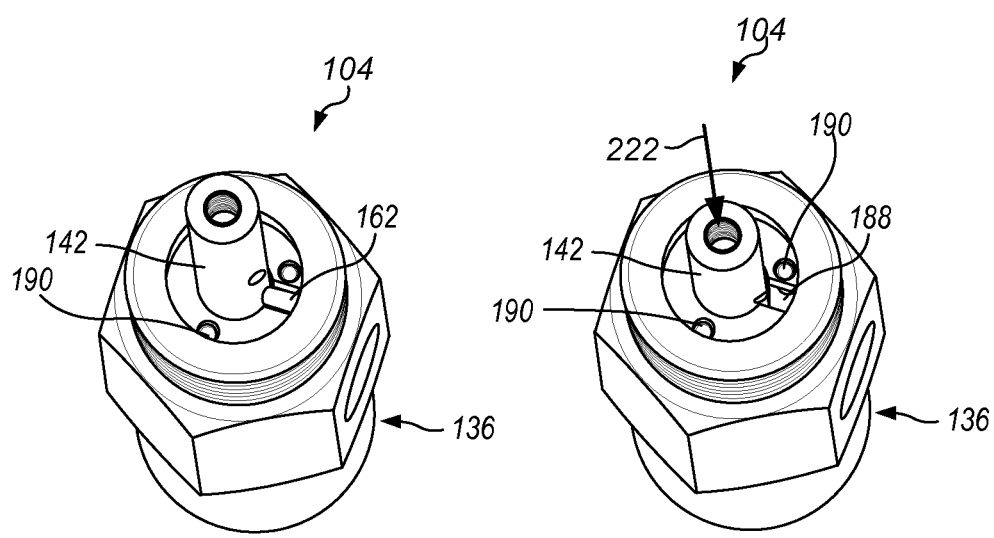
FIG. 7 is a perspective view of an embodiment of the servicing device in a released position.
FIG. 8 is a perspective view of an embodiment of the servicing device in an engaged position.

In some embodiments, servicing device 104 may be connected to fluid source 102 and to fluid receiving system 108 (see, for example, FIG. 1). When attached to fluid source 102 and fluid receiving system 108 servicing device 104 may be in a closed or released position. FIG. 7 depicts a perspective top view of servicing device 104 in a released or closed position with coupling member 140 removed. In a closed or released position, protrusion 162 may be positioned above or near the surface of servicing device body 136. When plunger 142 is in a released position, plunger end 168 may be disengaged from gating device 126 of integrated valve 122 (shown in FIG. 2). Thus, plunger 142 is in a closed position. In a closed position, fluid communication between passage 166 (third fluid port) and second fluid port 176 may be established allowing a parameter of receiving system 108 to be measured. For example, a level of refrigerant and/or pressure of receiving system 108 may be determined.

Servicing device 104 may be adjusted to an engaged (open) position to allow fluid communication between first fluid port 174 and second fluid port 176. Adjusting the plunger to an engaged position may change the position of the plunger such that a first portion of the plunger engages the integrated valve with sufficient force to adjust the integrated valve from a closed position to an opened position.

FIG. 8 depicts a perspective view of an embodiment of plunger 142 (with coupling member 140 removed) in an engaged or open position. Actuator 138 may be turned to align protrusion 162 with radial slot 188 of servicing device body 136. Force is exerted (for example, axial force as shown by arrow 222) on plunger 142 to move protrusion 162 through radial slot 188 to allow plunger 142 to move through bore 156 until plunger end 168 engages gating device 126 of integrated valve 122. Sufficient force may be applied to fully open integrated valve 122 and allow fluid from fluid source 102 to flow to receiving system 108. In some embodiments, protrusion 162 is moved into contact with one of pins 190. Pins 190 may inhibit over-torque of plunger 142 when excessive force is applied.

In some embodiments, servicing device is coupled to a fluid source that includes an ACME thread top with a seal. Adjusting a plunger having a piercing tip to the engaged position may break and/or piece a seal of the fluid source and allow fluid to flow from the fluid source through the servicing device.

Figure 9:
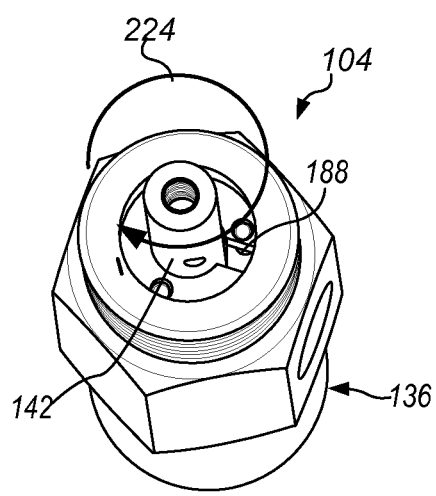
FIG. 9 is a perspective view of an embodiment of the servicing device in a locked position.

In some embodiments, plunger 142 may be a locked in an open position. FIG. 9 is a perspective view of servicing device 104 (with coupling member 140 removed) depicting plunger 142 in a locked position. Plunger 142 may be in a locked position when axial movement of the plunger is at least partially inhibited. Plunger 142 may be inhibited or be at least substantially inhibited when radial protrusion 162 is move out of alignment with radial slot 188. For example, when radial protrusion 162 is pushed in slot 188 and then rotated into annular groove 182 as shown by arrow 147. Positioning of protrusion 162 in annular groove 182 holds plunger 142 in an open position. Adjusting plunger 142 from an unlocked position to a locked position may include exerting torque on plunger 142 when radial protrusion 162 is disposed in annular groove 182, such that the radial protrusion is moved out of alignment with radial slot 188.

In some embodiments, servicing device 104 may be adapted to allow measurement of one or more parameters of the receiving system while inhibiting communication between the fluid source port and the measuring system or the fluid source port and the receiving system. Inhibiting communication to the fluid source allows the servicing device to be used to measure one or more parameters of the receiving system (for example, a refrigeration system such as an automobile refrigeration system) prior to attaching the servicing device to the fluid source (for example, a refrigerant cylinder).

Figure 10:
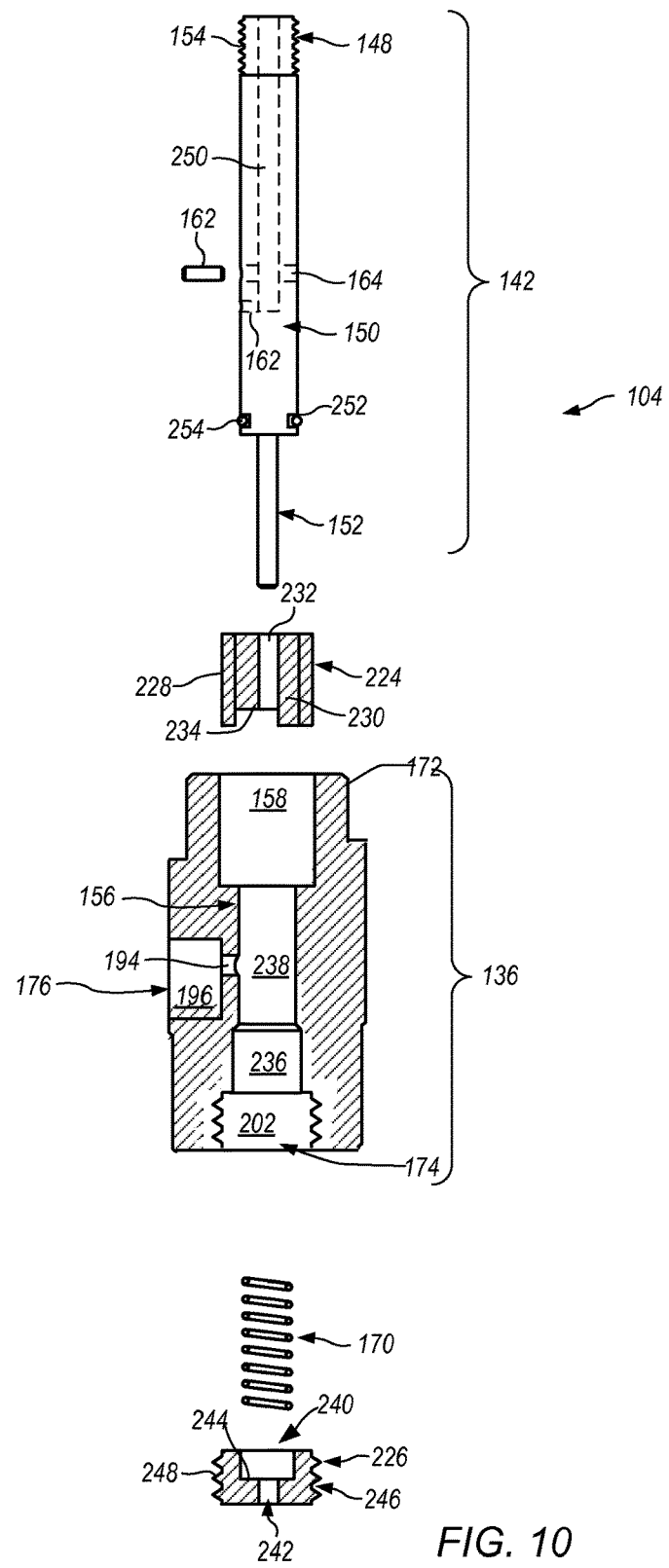
FIG. 10 is an exploded cross-sectional side view of the servicing device with a sealing member.

FIG. 10 is an exploded cross-sectional side view of another embodiment of servicing device 104. FIGS. 11A and 11B depict cross-sectional side views of servicing device 104 shown in FIG. 10 in various stages of use. Servicing device 104 may include servicing device body 136, plunger 142, insert 224, bias member 170, and plunger seat 226. Servicing device body 136 may include coupling element 172, opening 158, first fluid port 174, and second fluid port 176. Opening 158 is at least of sufficient size to receive insert 224. Frictional forces may retain insert 224 in opening 158. In some embodiments, opening 158 may include radial slot 188 and protrusion 162 as described in FIGS. 3-9 instead of insert 224.

Insert 224 may include insert body 228. Insert body 228 may be any suitable shape or size. As shown, insert body 228 is at least substantially cylindrical. Insert body 228 may include bore 230, slot 232, and circumferential opening 234. Bore 230 may be any suitable shape or size. As shown, bore 230 is at least substantially cylindrical. In some embodiments, bore 230 is at least of sufficient size to receive a portion of plunger body 150. In some embodiments, slot 232 may extend radially from axial bore 230 and through or substantially through insert body 228. In some embodiments, axial bore 230 extends through insert body 228 in a substantially axial direction. Radial slot 232 may be connected to opening 234. Radial slot 232 may be any suitable shape or size. In some embodiments, radial slot 232 is at least of sufficient size to receive protrusion 162 of plunger 142. For example, protrusion 162 may pass through slot 232 and into opening 234. Opening 234 may be any suitable shape or size. In some embodiments, opening 234 is at least of sufficient size to receive protrusion 162. Opening 234 may allow limited angular displacement of protrusion 162 with respect to servicing device body 136. For example, when protrusion 162 is positioned in opening 234, angular rotation of the plunger 142 may be limited to at least about 10 degrees. The angular rotation may be limited to about 10 degrees to about 90 degrees. Insert 224 may inhibit excess force (torque) to be applied to plunger 136 during use.

In some embodiments, servicing device body 136 includes bore 156 and coupling element 202. Bore 156 may be in fluid communication with opening 158 (third fluid port) and first fluid port 174. Bore 156 may varying in size and shape. For example, bore 156 may be at least substantially cylindrical. As shown, bore 156 includes portion 236 that has a diameter larger than the diameter than portion 238. One or more portions of bore 156 may be fluted. Fluting of portions of the passages and/or bore may allow sealing members to transition through the passages and/or inhibit degradation of the sealing members. In some embodiments, bore 156 is at least of sufficient size to receive at least a portion of plunger 142.

Coupling element 202 may couple plunger seat 226 to servicing device body 136. As shown, coupling element 202 includes interior threads arranged in a selected thread pattern. Coupling element 202 may be at least substantially complementary to a coupling element of plunger seat 226. Interior threads are at least substantially complementary to a set of exterior threads of plunger seat 226. It is understood that coupling element 202 includes features that are complimentary to fluid source 102 and allow servicing device 104 to be secured to the fluid source.

Plunger seat 226 may include opening 240, neck 242, and annular shoulder 244. Opening 240 may be any suitable shape or size. For example, opening 240 may be at least substantially circular having a diameter of sufficient size to receive bias member 170. Neck 242 may also be any suitable shape or size. In some embodiments, neck 242 is at least of sufficient size to receive at least a portion of plunger 142. As shown, neck 242 is at least substantially cylindrical having a diameter at least slightly larger than the diameter of plunger shaft 152. In some embodiments, an annulus is formed between an outer surface of plunger shaft 152 and an inner surface of neck 242. The annulus may be in fluid communication with the annulus formed between an outer surface of plunger 142 and an inner surface(s) of bore 156. Annular shoulder 244 may be formed by the union of opening 240 and neck 242. During use, bias member 170 may be at least partially supported by annular shoulder 244.

Plunger seat 226 may be removably coupled to servicing device body 136. In some embodiments, plunger seat 226 includes coupling element 246 for coupling the plunger seat to an external device or structure. Coupling element 246 may includes exterior threads 248 arranged in a selected thread pattern. Coupling element 246 may be at least substantially complementary to coupling element 202. For example, exterior threads 248 of coupling element 246 may be at least substantially complementary to interior threads 204 of coupling element 202

Plunger 142 includes plunger body 150 and plunger shaft 152. Plunger 142 may be received by servicing device body 136. For example, at least a portion of plunger body 150 may be disposed in bore 156 of servicing device body 136. In some embodiments, at least a portion of plunger body 150 is disposed in first portion 236 of bore 156 during use. In some embodiments, at least a portion of plunger body 150 is disposed in second portion 238 of bore 156 during use. Plunger body 150 may be any suitable shape or size. As shown, plunger body 150 is at least substantially cylindrical having a diameter of at most slightly less than the diameter of bore 156. When plunger body 150 is inserted in servicing device body 136, an annulus may be formed between an outer surface of plunger body 150 and an inner surface(s) of bore 156.

Plunger body 150 may include coupling element 148, third fluid port 250, radial opening 160, radial protrusion 162, radial passage 164, sealing groove 252, and sealing member 254. Coupling element 148 may couple plunger body 150 to actuator 138 as previously described.

Sealing groove 252 may receive sealing member 254. In some embodiments, sealing groove 252 is an annular indentation formed into plunger body 150. In some embodiments, sealing member 254 is an o-ring gasket composed of one or more materials that are chemically inert to the fluid flowing through portions of servicing device 104. In some embodiments, sealing member 254 may at least partially regulate the flow of fluid through servicing device body 136. When sealing member 254 is in portion 238 of bore 156, fluid communication between first fluid port 174 and second fluid port 176 and/or third fluid port 250 is inhibited or substantially inhibited. For example, sealing member 254 may seal a portion of bore 156 when plunger 142 is adjusted to a released position. Sealing a portion of bore 156 may be advantageous when using the integrated measuring device of actuator 138. As shown in FIG. 11A, sealing member 254 is positioned in portion 238 of bore 156 such that second fluid port 176 is isolated from first fluid port 174 while allowing fluid communication between the second fluid port 176 and third fluid port 250. As such, the integrated measuring device may provide fluid property readings in connection with only fluid receiving system 108. Thus, the integrated measuring device may provide fluid property readings in connection with fluid receiving system 108 when servicing device 104 is not coupled to fluid source 102.

As shown in FIG. 11B, advancement of plunger 142 into portion 236 of bore 156 allows fluid communication between first fluid port 174 and second fluid port 176. Advancement of plunger 142 along bore 156 may engage a portion of plunger end 168 with the portion of integrated valve 122 (not shown) of fluid source 102. Radial protrusion 162 may limit rotation of plunger 142 while traversing bore 156. Engaging plunger end 168 with an integrated valve adjusts the integrated valve from a closed position to an opened position.

In some embodiments, servicing device 104 is configured to allow fluid communication between second fluid port 176 and third fluid port 250 while inhibiting fluid communication to first fluid port 174 or allow fluid communication between second fluid port 176 and first fluid port 174 while inhibiting fluid communication between fluid port 174 and third fluid port 250. When fluid flow is inhibited to third fluid port 250, measuring device 146 may indicate a zero or substantially zero valve.

FIG. 12 is an embodiment of servicing device 104 having at least two sealing members. Bore 156 of servicing device 104 may include portion 256. Portion 256 may have a diameter larger than portion 238 of bore 156. Plunger body 150 may include radial opening 160, radial protrusion 162, radial passage 164, fluid port 250, coupling element 148, sealing grooves 252, and sealing members 254, 258. Sealing grooves 252 may receive sealing members 254, 258. In some embodiments, sealing grooves 252 are annular indentations formed into plunger body 150. In some embodiment, sealing members 254, 258 are o-ring gaskets composed of one or more materials that are chemically inert to the fluid flowing through portions of servicing device 104. In some embodiments, sealing members 254, 258 may at least partially regulate the flow of fluid through servicing device body 136.

Positioning of plunger 142 such that sealing member 254 is in portion 238 of bore 156 and sealing member 258 is in portion 256 of bore 156 allows fluid communication between second fluid port 176 and third fluid port 250 while inhibiting or substantially inhibiting fluid communication to first fluid port 174. Positioning of plunger 142 such that sealing member 254 is in portion 236 and sealing member 258 is in portion 238 allows fluid communication between second fluid port 176 and first fluid port 174 while inhibiting or substantially inhibiting fluid communication to third fluid port 250. Sealing a portion of bore 156 may be advantageous when using the integrated measuring device of actuator 138. Using the servicing device 104 may allow determination of fluid properties in connection with only fluid receiving system 108 and/or during use of fluid source 102. For example, the integrated measuring device may provide fluid pressure readings of fluid receiving system 108 when servicing device 104 is not coupled to fluid source 102.

In some embodiments, a method of determining properties of a fluid receiving system may include attaching one or more servicing devices described herein to a fluid receiving system. In some embodiments, the properties of the fluid receiving system may be determined without attaching servicing device 104 to fluid source 102 (see, for example, FIGS. 10-12). A fluid port of servicing device 104 may couple to fluid receiving system 108.

In some embodiments, a refrigerant system is serviced using servicing device 104 described herein. Refrigerant system, in some embodiments, is an automobile air conditioning system. Servicing device may be coupled to refrigerant system using a hose or other suitable conduit to a low pressure side of a refrigerant system and a refrigerant fluid source. Torque may be applied to an actuator of the servicing device (for example, a handle of the servicing device may be turned and pushed) to open the servicing device and allow fluid communication between the refrigerant source and the refrigerant system. The servicing device may be locked in the open position. After a period of time, the handle turned in an opposite direction to unlock and close the servicing device. A position of the handle may be varied to regulate the flow of refrigerant from the fluid source to the refrigerant system. Once an adequate level is reached the servicing device may be disconnected from the refrigerant system and then from the fluid source.

In some embodiments, the servicing device includes a measuring device. After connecting the servicing device to the fluid source and the refrigerant system, a pressure and/or level of refrigerant of the refrigerant system may be determined using the servicing device in a closed position. If the refrigerant level is adequate, the servicing device may be disconnected. If refrigerant is required, torque may be applied to an actuator of the servicing device (for example, a handle of the servicing device may be turned and pushed) to open the servicing device and allow fluid communication between the refrigerant source and the refrigerant system. The servicing device may be locked in the open position until and refrigerant added to the refrigeration system until the measuring device indicates that sufficient refrigerant has been added.

After a period of time, the servicing device may be unlocked (for example, the handle may be turned in an opposite direction to unlock and release the servicing device). The pressure and level of refrigerant in the refrigerant system may be determined. A position of the handle may be varied to regulate the flow of refrigerant from the fluid source to the refrigerant system. Once an adequate level is reached the servicing device may be disconnected from the refrigerant system and then from the fluid source. The process or variations of the process may be repeated until the level of refrigerant in the refrigerant is adequate.

Figure 13:
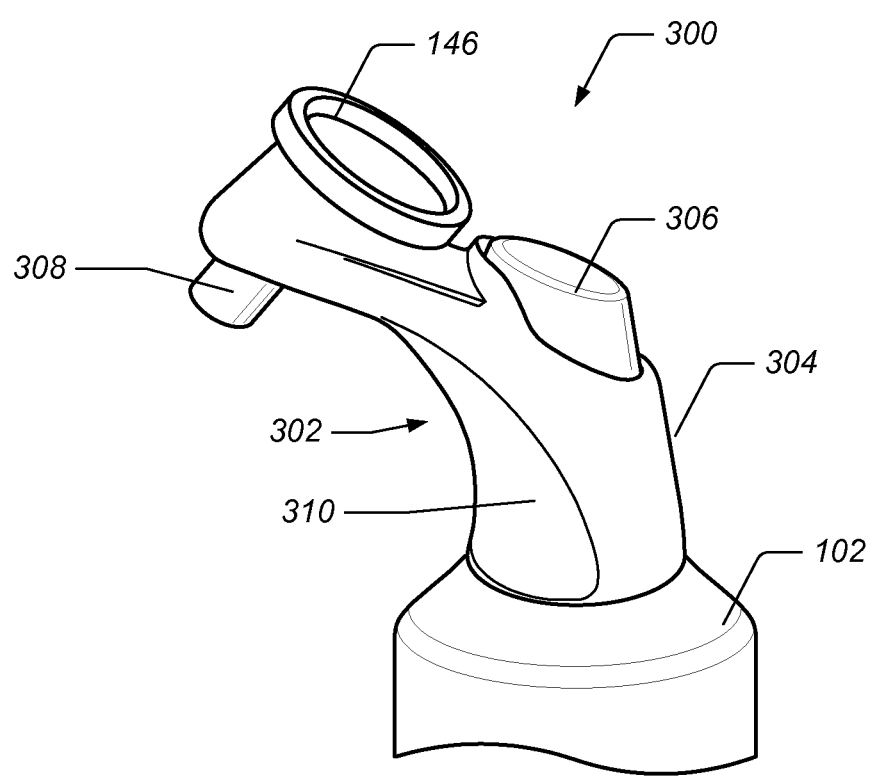
FIG. 13 depicts a perspective side view of an embodiment of a refrigeration system.
Figure 14:
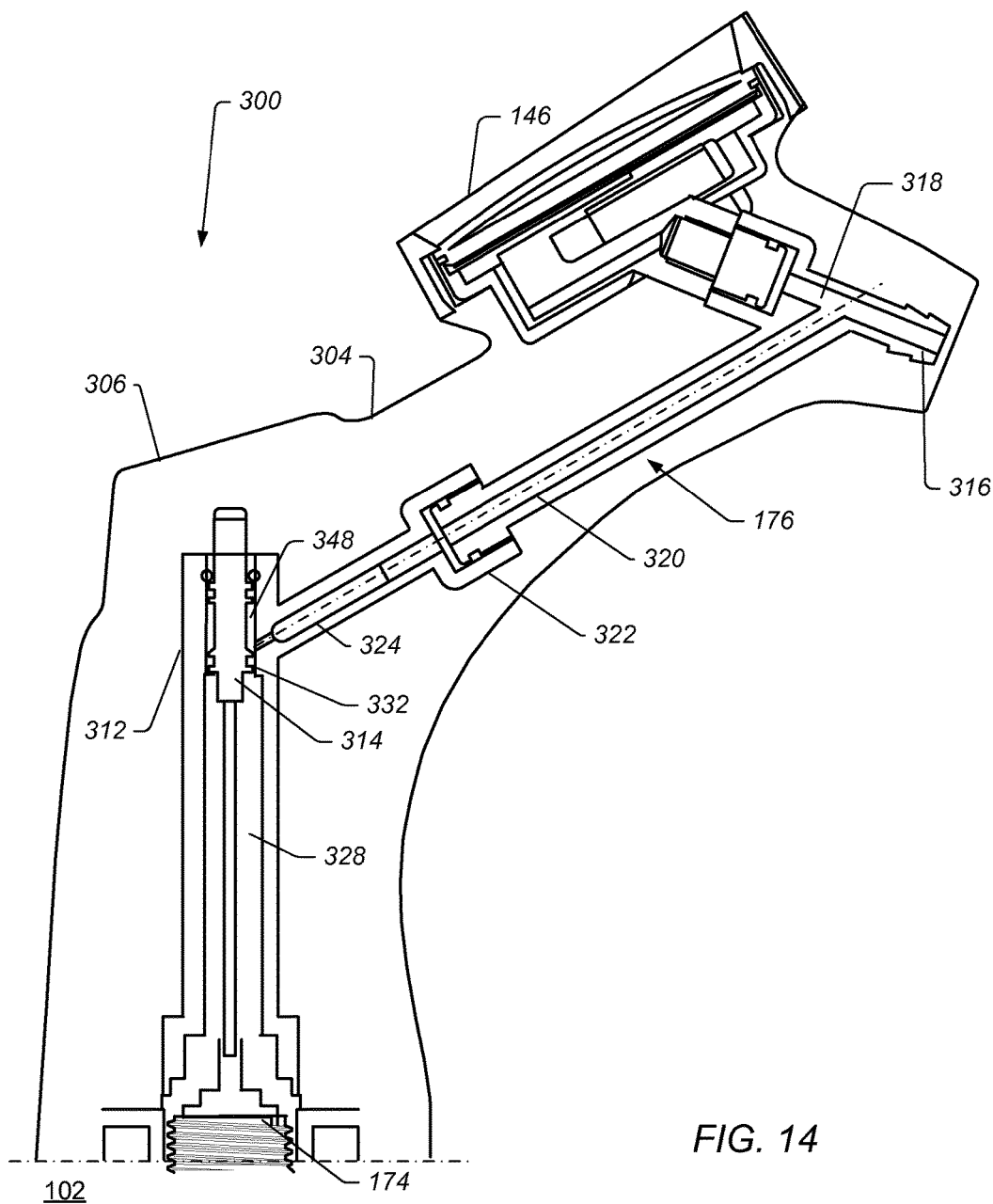
FIG. 14 depicts a cut-away view of an embodiment of refrigeration system servicing/measuring device in a measuring mode.
Figure 15:
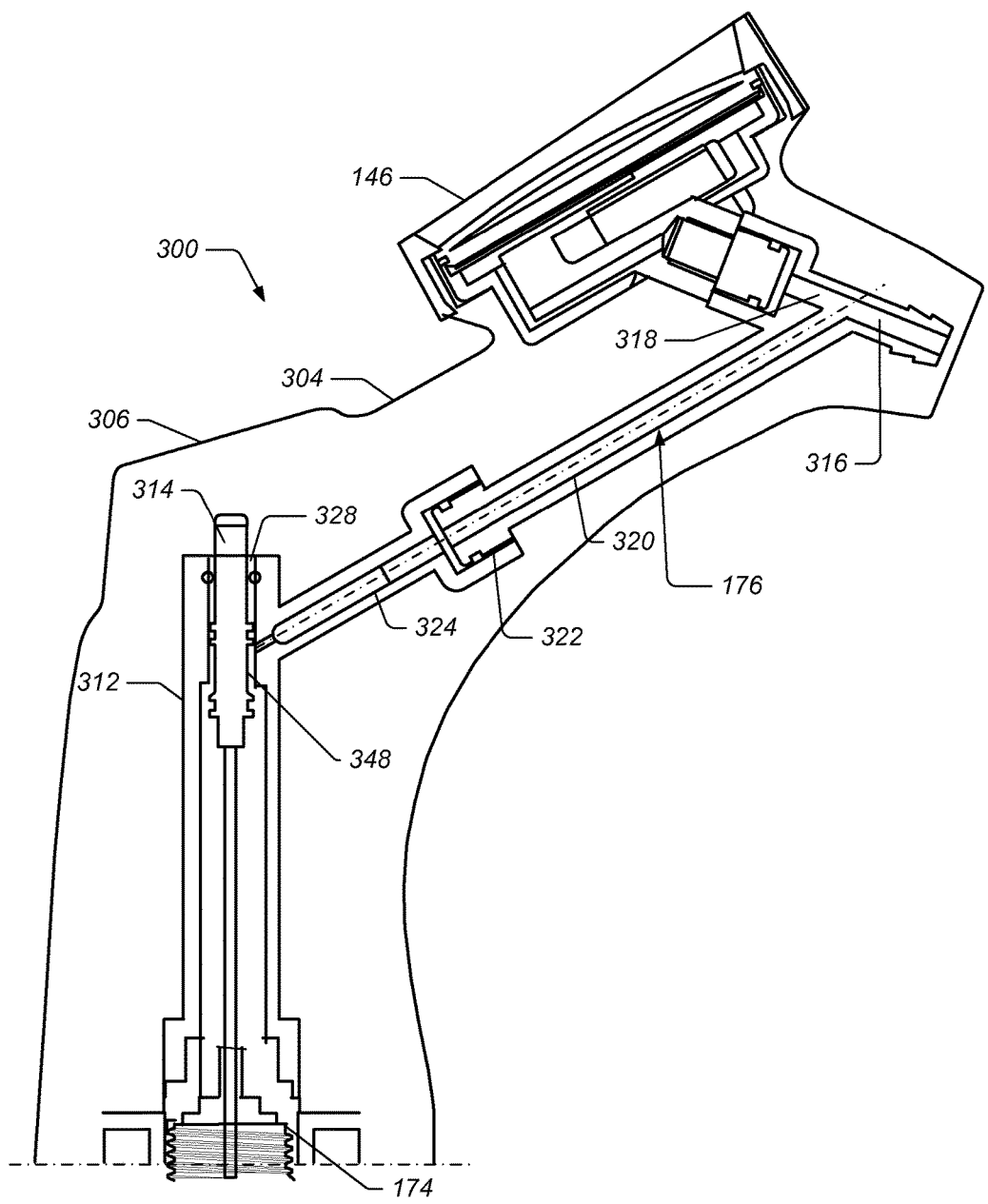
FIG. 15 depicts a cut-away view of an embodiment of a refrigeration system servicing/measuring device in a charging mode of operation.

In some embodiments, servicing device 104 and measuring device 146 are contained in one unit that is operated using one hand. FIGS. 13-15 depict embodiments of a servicing/measuring device. FIG. 13 depicts a perspective side view of an embodiment of a servicing/measuring device 300 attached to fluid source 102. FIG. 14 depicts a cross-sectional view of an embodiment of servicing/measuring device 300 in a measuring mode. FIG. 15 depicts a cross-sectional view of an embodiment of servicing/measuring device 300 in a charging mode of operation. In some embodiments, servicing device 300 may be used to determine the level of refrigerant in the receiving system 108 and/or add refrigerant to the receiving system from the fluid source 102.

Referring to FIG. 13, servicing device 300 may include housing 302. Housing 302 may be made of synthetic and/or semi-synthetic organic materials. For example, thermoplastic and/or thermosetting polymers. Examples of polymers include, but are not limited to, polyethylene, polypropylene, polystyrene, polyvinyl chloride, polytetrafluoroethylene, rubber, or combinations thereof. Portion or all housing 302 may be made using known polymer techniques (for example, injection molding). Portions of housing 302 may be assembled and/or the housing may be one piece.

Housing 302 may include body 304, actuator 306, measuring device 146, and servicing system connector 308. Body 304 may be may be arcuate, contoured, or shaped to fit in an operator's hand. Grip 310 of body 304 may be textured or made of a material (for example, rubber or synthetic rubber) that promotes gripping. In some embodiments, grip 310 may be a different color than other portions of body 304.

In some embodiments, measurement device 146 is a pressure gauge used to measure the pressure of the refrigerant in receiving system 108. It is contemplated that the measurement device 146 may be adapted to measure other suitable parameters of the receiving system 108. In some embodiments, measurement device 146 is a pressure gauge that includes Bourdon pressure tube. The pressure gauge apparatus may include a pressure scale, a pressure indicator, and indices that indicate if the amount of refrigerant in the refrigerant service unit.

Actuator 306 may be a push-button. When pushed, actuator 306 may contact valve 314 inside of housing 302, and thus allow fluid communication between fluid source 102 and receiving system 108. Actuator 306 made of any material thermoplastic and/or thermosetting polymers. In some embodiments, actuator 306 has the capability to undergo deformation under pressure and return to its original shape when released. In some embodiments, actuator 306 is made of hard plastic.

Referring to FIGS. 14 and 15, servicing device 300 includes central body 312, valve 314, first fluid port 174 and second fluid port 176 and third fluid port 316. Central body 312 may include or communicate with first fluid port 174 and second fluid port 176. Valve 314 may provide selective communication between receiving system 108, and measurement device 146 while inhibiting communication between fluid source 102 and the receiving system and the measurement device. Valve 314 may be adapted such that selective communication between second fluid port 176 and third fluid port 316 is achieved, while inhibiting communication between first fluid port 174 and the second fluid port and the third fluid port. Thus, servicing device may be used for measuring one or more parameter of the receiving device without being connected to a fluid source.

Second fluid port 176 may include first portion 318 and second portion 320. First portion 318 may include third fluid port 316. First portion 318 and third fluid port 316 may be a single passage positioned perpendicular or substantially perpendicular to second portion 320. For example, first portion 318 and third fluid port 316 form a T-shape. Portions of second fluid port 176 and third fluid port 316 may be manufactured from polymers, plastic, metal, and/or combinations thereof. Second fluid port 176 and third fluid port 316 may be formed as components or as one piece. Second portion 320 may have a total length that is greater than a total length of first portion 318, a total length of third fluid port 316 or a total length of the first portion and the third fluid port. Second portion may be supported by support 322.

Figure 16:
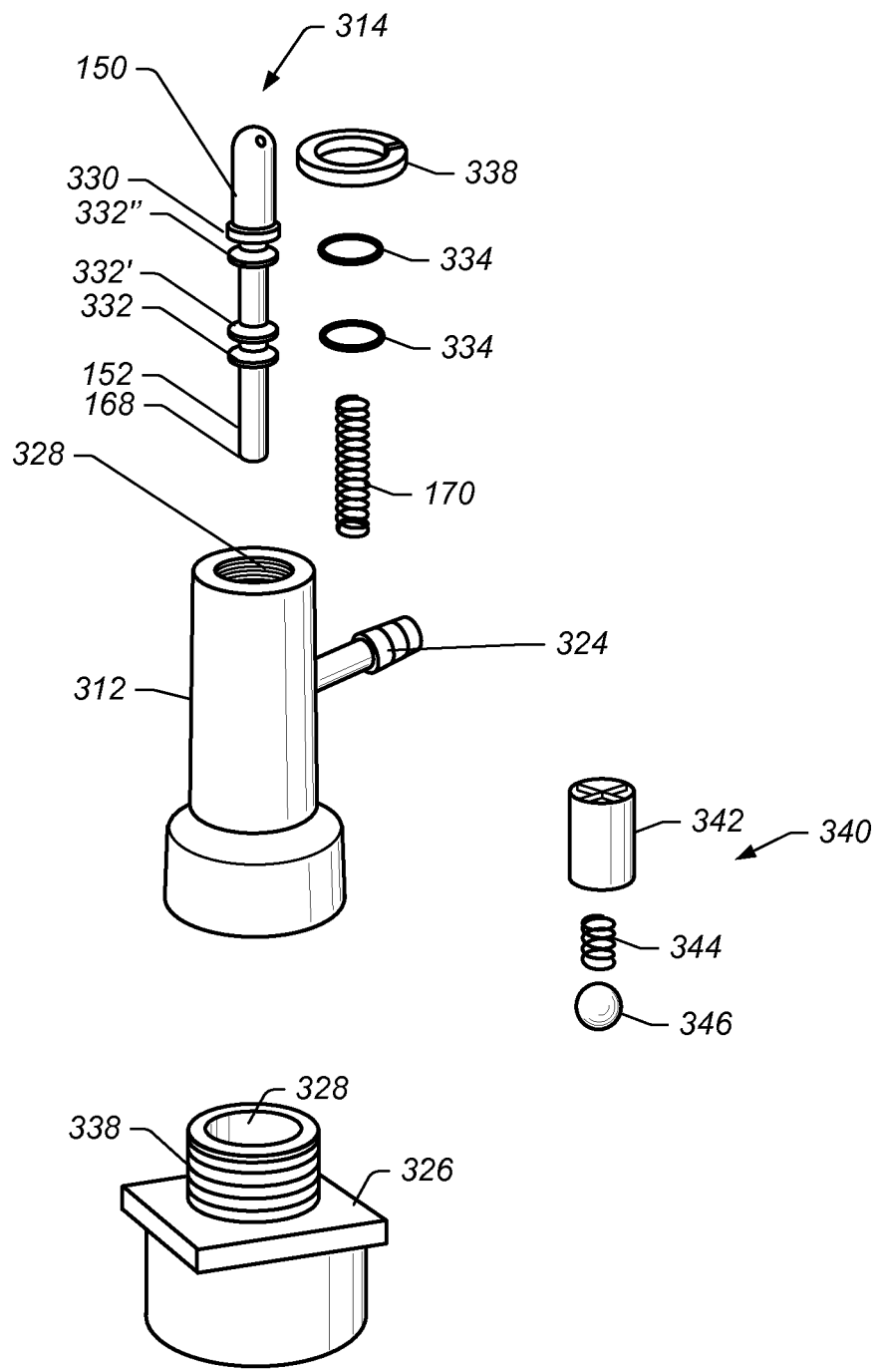
FIG. 16 depicts an exploded perspective view of embodiments of a central body, a valve, a check valve, and a coupler of a refrigeration system servicing device depicted in FIGS. 13-15.

Second portion 320 may connect to second fluid coupler 324 of central body 312. FIG. 16 depicts an exploded view of embodiments of central body 312, valve 314 and coupler 326. Central body 312 may include first fluid port 174 and second fluid coupler 324, and passage 328 (inner bore). First fluid port 174 may be adapted to connect to fluid receiving system 108. Second fluid coupler 324 may be connect or be an integral part of second fluid port 176. Central body 312 may be formed of material compatible with the fluid source. For example, central body may be 312 formed of metal, polymeric material and/or combinations thereof. In some embodiments, central body 312 is formed from polymers and molded. Central body may be inserted into housing 302. Central body may be secured in housing 302 by snap fitting, epoxying, or other known methods.

Valve 314 may be slidably disposed in passage 328 of central body 312. Valve 314 may allow selective communication between first fluid port 174 and second fluid port 176/third fluid port 316, in response to an actuation of the valve actuator 306. Valve 314 may be adapted to engage a self-sealing valve and/or a complementary plunger of an integrated valve of the fluid source to enable fluid to flow from the fluid source.

Valve 314 may include body 150 and shaft 152. Body 150 may have an outside diameter that is greater than the outside diameter of shaft 152. In some embodiments, the outside diameter of body 150 ranges from 0.15 to 0.25 inches and the outside diameter of shaft 152 ranges from about 0.05 to about 0.13 inches. The outside diameter of body 150 may be about 30% greater to about 55% greater than the outside diameter of shaft 152. In some embodiments, a ratio of outside diameter of body 150 to the diameter of shaft 152 ranges from 1.5 to 2.0. In some embodiments, body 150 and shaft 152 are formed integrally. For example, body 150 and shaft 152 are provided as one piece. In some embodiments, shaft 152 may be press-fitted, welded, soldered, or glued to body 150.

Plunger body 150 may include lip 330 and plunger shaft 152 may include rings 332, 332' 332". Lip 330 and rings 332, 332', 332" may be formed as an integral part of valve 314. In some embodiments, the lip and the rings formed as separate pieces and coupled to the plunger body and the plunger shaft. Outer diameters of lip 330 and rings 332, 332', 332" may be greater than the outer diameter of plunger body 150. Lip 330 and rings 332, 332', 332" may allow valve 314 to provide selective communication between (a) first fluid port 174 and second fluid port 176/third fluid port 316 and (b) second fluid port 176 and third fluid port 316, in response to an actuation of the valve actuator 306 of servicing device 300 as shown in FIGS. 14 and 15.

Sealing members 334 may be positioned adjacent to lip 330 and lower ring 332. For example, sealing members may be positioned between lip 330 and ring 332' and/or between rings 332" and 332. Sealing members 334 may substantially prevent communication between second fluid port 176 and third fluid port 316 with first fluid port. Gasket 336 may be used to seal form a seal between central body 312, and housing 304.

Plunger end 168 includes a smooth, rounded, or blunt shape capable of engaging and moving the components of the self-sealing valve of fluid source 102. When valve 314 is actuated to a charged position, plunger end 168 may contact check valve 340. Contact with check valve 340 may move insert 342 (for example, in an axial direction) and allow plunger end 168 to overcome biasing member 344 and move ball 346 into an open position so that fluid may flow from fluid source 102 to the receiving system 108 while inhibiting fluid flow from the receiving system to the fluid source 102.

In some embodiments, plunger end 168 may be complementary to a gating device of the fluid supply source such that the engagement end engages the gating device without damaging the plunger (for example, without piercing or scratching a surface of the self-sealing valve). Plunger end 168 may include a substantially flat surface having a chamfered edge. In some embodiments, plunger end 168 includes a completely flat surface, curved surface (for example, hemispherical surface), or the like.

A portion of valve 314 (for example, plunger shaft 152) may be biased within passage 328 in an upward direction by biasing member 170. Biasing member 170 may be a spring or the like. Biasing member 170 may be positioned between plunger shaft 152 and insert 342 some embodiments, a portion of valve 314 may be biased upward, away from the self-sealing valve to inhibit the plunger end 168 from engaging with the integrated valve when the servicing device 300 is coupled to fluid source 102.

Referring to FIGS. 14-16, valve 314 may be positioned in passage 328. Annulus 348 may be formed between an inner wall of central body 312 and valve 314. As valve 314 is moved in passage 328, annulus 348 may align with second fluid port 176. Aligning annulus 348 with second fluid port 176 may allow selective fluid communication between portions of passage 328 with second fluid port 176 and third fluid port 316 while inhibiting fluid communication between first fluid port 174 and second fluid port 176. When annulus 348 is not aligned with second fluid port 176, fluid communication is allowed between first fluid port 174 and second fluid port 176 and third fluid port 316.

Sealing members 334 may selectively inhibit communication between passage 328 with first fluid port 174 and second fluid port second fluid port 176 and third fluid port 316. In some embodiments, a diameter of a portion of passage 328 that aligns with first fluid port 174 may be less than a diameter of a portion of the passage that aligns with second fluid port 176.

In some embodiments, portions of passage 328 and/or the fluid ports are fluted. Fluting of portions of passage 328 may enhance flow of fluid from the fluid supply to the receiving system. For example, the portion of passage 328 that allows communication between fluid source 102 and/or first fluid port 174 may be fluted. Fluting of the portion of passage 328 may allow sealing members 334 to transition from portions of the passage that are different in size (for example, moving from a portion of the bore having a larger diameter to portion of the bore having a smaller diameter). Thus, smooth valve operation and gas flow from the fluid source to the receiving system may be achieved.

In some embodiments, servicing device 300 may be coupled to a fluid source using coupling member 326. Coupling member 326 may couple to central body 312. For example, coupling member 326 may have threads 338 complimentary to threads of central body 312. One or more gaskets may be used between coupling member and central body 312 to enhance the seal between the two parts. In some embodiments, coupling member 326 is formed as a part of central body 312. Passage 328 may extend through coupling member 326 to allow plunger end 168 to exit servicing device 300 during charging.

Coupling member 326 may allow servicing device 300 to be coupled with coupling member 124 or threaded member 134 of fluid source 102. For example, servicing device 300 may be connected to fluid source 102 by threading a coupling element of the servicing device onto a male thread of the refrigerant supply and to a receiving system 108 (for example, an automobile refrigeration system) by servicing system connector 308. Coupling member 326 may be complimentary to a coupling member on fluid supply 102. In some embodiments, coupling member 326 is a threaded member that is complementary to an ACME thread on a refrigerant can that includes a self-sealing valve and/or an ACME thread on a refrigerant can that includes a penetrable seal. During connection of servicing device 300 to fluid source 102 and receiving system 108, actuator 306 (push-button) may remain in an extended position.

Referring to FIG. 14, actuator 306 is in a released (measuring) position and servicing device 300 may be used to measure the pressure of the refrigerant in the refrigeration system using measuring device 146. In a measuring or released position, actuator 306, valve 314 is disengaged from the integrated valve of fluid source 102. As a result, refrigerant from the refrigerant supply is inhibited through passage 328 and through first fluid port 174. When actuator 306 is in a measuring position, valve 314 is biased into its upper position by biasing member 170, and fluid communication between the third fluid port 316 (which is connected to receiving system 108) and second fluid port 176 (which is connected to the measurement device 146) is provided.

In the measuring (released) position, ring 332, sealing members 334, check valve 340 (see, for example, FIG. 16), or combinations thereof may substantially prevent communication between first fluid port 174 and second fluid port 176 and third fluid port 316. For example, communication between a refrigerant can and/or the atmosphere and the measuring devices and the refrigerant system is inhibited. As a result, second fluid port 176 experiences pressure similar to the pressure of third fluid port 316 which, in turn, is similar to the internal pressure of the receiving system 108 (for example, automobile refrigeration system). In this manner, measurement device 146 may measure the refrigeration system pressure (or other parameter in alternative embodiments).

Depression of actuator 306 (push-button) moves valve 314 to allow plunger end 168 to engage with the self-sealing valve (see, for example, FIG. 2) of fluid source 102. Engagement of the plunger end 168 moves (depresses) the self-sealing valve into an open position. Opening the self-sealing valve may allow fluid (for example, refrigerant) to flow from fluid source 102 through passage 328, to second fluid port 176 and third fluid port 316, and then to receiving system 108 (for example, a refrigeration system). Release of actuator 306 may allow valve 314 to return to its measuring position under the influence of biasing member 170. Release of actuator 306 may disengage plunger end 168 from the self-sealing valve of fluid source 102.

It is contemplated that other suitable means for providing an actuating force to the valve are considered to be within the scope of the present invention. For example, means for actuating the valve with the handle are considered within the scope of the present invention, including, but not limited to, hydraulic, mechanical, or pneumatic members that could be used to link the plunger portion of the valve with the handle. In addition, the valve actuator may be adapted to receive other actuation forces, such as, for example, pulling, rotating, and/or pushing forces.

A pressure of receiving system 108 may be assessed and the level of refrigerant in the receiving system may be determined. In some embodiments, the measurement device 146 may indicate the need for additional refrigerant, for example, by displaying a measurement reading. If a need for additional refrigerant is determined, servicing device 300 may be used to charge receiving system 108 with fluid from fluid source 102. Alternating between providing refrigerant to the refrigeration system and measuring a parameter of the refrigeration system may be performed by applying an actuation force to valve 314 by pushing and releasing actuator 306 as desired.

It is appreciated that servicing device 300 may be adapted to selectively switch between the charging mode of operation and the measuring mode of operation in alternative ways. For example, it is contemplated that servicing device 300 may be adapted such that an actuation force is applied for measuring operation, and no actuation force is applied to valve 314 for charging operation.

In some embodiments, the servicing device may be sold and/or packaged as a complete product or as part of a kit. The kit may also include, a fluid source (for example, a can of refrigerant and/or refrigerant containing additives), additional measuring devices (for example, temperature gauge), safety glasses, towels, funnels, an activating light source (for example, an UV light), or combinations thereof. The kit may be packaged in a carrying case with pre-formed segments to hold the components of the kit. In some embodiments, the carrying case may be plastic and/or include a handle. In some embodiments, the pre-formed segments may be removable.

In some embodiments, a refrigerant system is serviced using servicing device 300 described herein. Refrigerant system, in some embodiments, is an automobile air conditioning system. Servicing device may be coupled to refrigerant system using a hose or other suitable conduit to a low pressure side of a refrigerant system. A pressure and/or level of refrigerant of the refrigerant system may be determined. If the refrigerant level is adequate, the servicing device may be disconnected. If the refrigerant level is low, the servicing device may be connected to a fluid source (for example, a can of automobile refrigerant). While holding the servicing device 300 attached to the refrigerant can, the push-button (actuator) of the service device may be depressed sufficiently (for example, pressed with a thumb) to open the fluid source. Fluid (for example, refrigerant) from the fluid source may flow from the fluid source through the service device and into the refrigerant system. The push-button may be released and the pressure and level of refrigerant in the refrigerant system may be determined. The process may be repeated until the level of refrigerant in the refrigerant is adequate. The push button may be depressed to various depths to regulate the flow of refrigerant from the fluid source to the refrigerant system. Once an adequate level is reached the servicing device may be disconnected from the refrigerant system and then from the fluid source.

The depiction of the housing, the valve actuator, and the valve are intended to be illustrative only, and not limiting. It is appreciated that the size and shape of the housing may vary markedly without departing from the intended scope of the present invention. These and other modifications to the above-described embodiments of the invention may be made without departing from the intended scope of the invention. It will be apparent to those skilled in the art that various other modifications and variations can be made in the construction, configuration, and/or operation of the present invention without departing from the scope or spirit of the invention.

In this patent, certain U.S. patents and U.S. patent applications have been incorporated by reference. The text of such U.S. patents and U.S. patent applications is, however, only incorporated by reference to the extent that no conflict exists between such text and the other statements and drawings set forth herein. In the event of such conflict, then any such conflicting text in such incorporated by reference U.S. patents and U.S. patent applications is specifically not incorporated by reference in this patent Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A device for servicing an automobile refrigerant system, comprising:
    a body, the body comprising:
        a first fluid port, wherein the first fluid port is couplable to a fluid port of a fluid source;
        a second fluid port, wherein the second fluid port operatively couples to a refrigeration system;
        a passage in fluid communication with the first and second fluid ports and in fluid communication with a measuring device; and
    a plunger at least partially disposed in the passage of the body, a first portion of the plunger being engagable with an integrated valve of the fluid source, wherein the plunger is adjustable between a released position and an engaged position, and wherein adjustment of the plunger to the released position during use allows communication between the second fluid port and the measuring device while inhibiting communication between the first fluid port and the fluid source;
    wherein the plunger is disposed in the passage of the body such that the plunger is at least substantially free to rotate within a selected angular range, and the device further comprising one or more inhibitors for restricting rotation of the plunger to the selected angular range, and wherein a magnitude of the selected angular range is at least about 10 degrees; and
    wherein the plunger comprises one or more gaskets for inhibiting unintentional release of fluid from the body during use.

2. The device of claim 1, wherein the plunger comprises a shaft, and wherein the first portion of the plunger comprises an end of the shaft, the end of the shaft being at least substantially complementary to a portion of the integrated valve.

3. The device of claim 1, wherein a second portion of the plunger comprises a protrusion extending outward from an elongated body of the plunger.

4. The device of claim 1, wherein the passage extends through at least a portion of the body.

5. The device of claim 1, wherein the body comprises a groove for receiving the second portion of the plunger during use.

6. The device of claim 1, wherein the fluid source comprises a pressurized container of refrigerant.

7. The device of claim 1, wherein the plunger comprises a second portion engageable with a portion of the body during use, and wherein simultaneous engagement of the first portion of the plunger with the portion of the self-sealing valve and the second portion of the plunger with the body suspends the self-sealing valve in the opened position to allow continuous fluid communication between the refrigeration source and the refrigeration system during use.

8. A device for servicing an automobile refrigeration system, comprising:
    a body, the body comprising:
        one or more fluid ports, at least one of the fluid ports being coupled to a fluid port of a fluid source during use, the fluid source comprising a self-sealing valve adjustable between an opened position and a closed position; and
        a passage in fluid communication with the fluid ports during use; and
    a plunger disposed in the passage of the body, wherein the plunger is adjustable between a released position and an engaged position such that, when the plunger is adjusted to the released position, the self-sealing valve is simultaneously adjusted to the closed position and when the plunger is adjusted to the engaged position the self-sealing valve is simultaneously adjusted to the opened position;
    wherein the plunger is adjustable between a locked position and an unlocked position such that, when the plunger is adjusted to the locked position, the self-sealing valve is suspended in the opened position to allow continuous fluid communication between the fluid source and the body;
    wherein the plunger disposed in the passage of the body is at least substantially free to rotate within a selected angular range, and the device further comprising one or more inhibitors for restricting rotation of the plunger to the selected angular range, and wherein a magnitude of the selected angular range is at least about 10 degrees.

9. A method of servicing an automobile refrigeration system, comprising:
    providing a first fluid port of a servicing device to a fluid port of a fluid source;
    providing a second fluid port of the servicing device to a fluid port of a refrigeration system;
    adjusting a self-sealing valve from a closed position to an opened position by engaging an end of a plunger of the servicing device with the self-sealing valve of the fluid source;
    engaging a second portion of the plunger with a portion of a body of the servicing device to inhibit axial movement of the plunger;
    allowing continuous fluid flow between the fluid source, through the body of the servicing device, and then to the refrigeration system; and
    disengaging the plunger from the portion of the body by rotating the plunger, wherein disengaging the plunger from the portion at least partially disengages the end of the plunger from the self-sealing valve.

10. The method of claim 9, wherein engaging the end of the plunger with the self-sealing valve comprises adjusting an axial position of the plunger.

11. The method of claim 9, wherein engaging the end of the plunger with the self-sealing valve comprises adjusting an axial position of the plunger by aligning the second portion of the plunger with a radial slot of the body and applying an axial force to the plunger.

12. The method of claim 9, wherein engaging the second portion with the portion of the body comprises rotating the plunger.

13. The method of claim 9, wherein engaging the second portion of the plunger with the portion of the body comprises inserting the second portion of the plunger in an annular groove of the body and rotating the plunger.

14. The method of claim 9, further comprising determining a pressure of the system using a measuring device coupled to a third fluid port of the body.

15. The method of claim 14, wherein a value of the measuring device is zero when the self-sealing valve is in the opened position.

16. The device of claim 1, wherein the fluid source comprises a self-sealing valve adjustable between an opened position and a closed position.

17. The device of claim 16, wherein the plunger is adjustable between a locked position and an unlocked position such that, when the plunger is adjusted to the locked position, the self-sealing valve is suspended in the opened position to allow continuous fluid communication between the fluid source and the body.

\* \* \* \* \*